(12) United States Patent
Higuchi et al.

(10) Patent No.: US 6,199,689 B1
(45) Date of Patent: Mar. 13, 2001

(54) CARTRIDGE HOLDER

(75) Inventors: Shintaro Higuchi; Yoshiyuki Abe; Hiroshi Meguro, all of Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/445,372
(22) PCT Filed: Jun. 25, 1999
(86) PCT No.: PCT/JP99/03388
§ 371 Date: Dec. 6, 1999
§ 102(e) Date: Dec. 6, 1999
(87) PCT Pub. No.: WO00/00412
PCT Pub. Date: Jan. 6, 2000

(30) Foreign Application Priority Data

Jun. 29, 1998 (JP) .................................................. 10-182785
Jun. 29, 1998 (JP) .................................................. 10-182787
Aug. 14, 1998 (JP) .................................................. 10-229740

(51) Int. Cl.[7] .................................................. B65D 85/57
(52) U.S. Cl. ...................................... 206/308.3; 206/308.1
(58) Field of Search .......................... 206/307.1, 308.1, 206/308.3, 309, 311, 312, 1.5, 477–478, 232, 472, 473; 220/836, 837; 211/40; 369/289–292

(56) References Cited

U.S. PATENT DOCUMENTS

| | | | | |
|---|---|---|---|---|
| 5,293,995 | * | 3/1994 | Iwaki et al. ........................ | 206/308.1 |
| 5,477,960 | * | 12/1995 | Chen .................................. | 206/308.1 |
| 5,531,322 | * | 7/1996 | Iwaki et al. ........................ | 206/308.1 |
| 5,597,068 | * | 1/1997 | Weisburn et al. ................. | 206/308.1 |
| 5,727,681 | * | 3/1998 | Li ....................................... | 206/308.1 |
| 5,971,144 | * | 10/1999 | Heiligers ........................... | 206/308.1 |

FOREIGN PATENT DOCUMENTS

| | | |
|---|---|---|
| 6-135481 | 5/1994 | (JP) . |
| 7-8284 | 2/1995 | (JP) . |

* cited by examiner

Primary Examiner—Luan K. Bui
(74) Attorney, Agent, or Firm—Frommer Lawrence & Haug, LLP.; William S. Frommer; Mathew K. Ryan

(57) ABSTRACT

A cartridge holder is shown which comprises a back portion which has at an inner surface a plurality of cartridge gripping parts by which one sides of cartridges are gripped, a pair of lid portions which are pivotally connected to opposed sides of the back portion through respective major hinge portions; catching and caught portions which are provided at free ends of the lid portions and lock the lid portions when the lid portions are pivoted toward their closed position; and a plurality of extra hinge portions which are defined by the back portion. By roundly flexing the back portion at the major hinge portions, the cartridge gripping parts, that is, the cartridges gripped by these cartridge gripping parts are opened like a fan. Thus, upper ends of the cartridges are separated thereby facilitating handling of the upper ends of the cartridges by the fingers of a user. In order to prevent a swell-out phenomenon of the back portion which would occur when the back portion is roundly flexed, there is provided a swell-out phenomenon suppressing means. In order to prevent removal of the cartridges from the cartridge gripping parts which would occur when vibration and shock are applied thereto under conveying of the holder, there is provided a cartridge retaining rib.

19 Claims, 38 Drawing Sheets

FIG.5
FIG.6
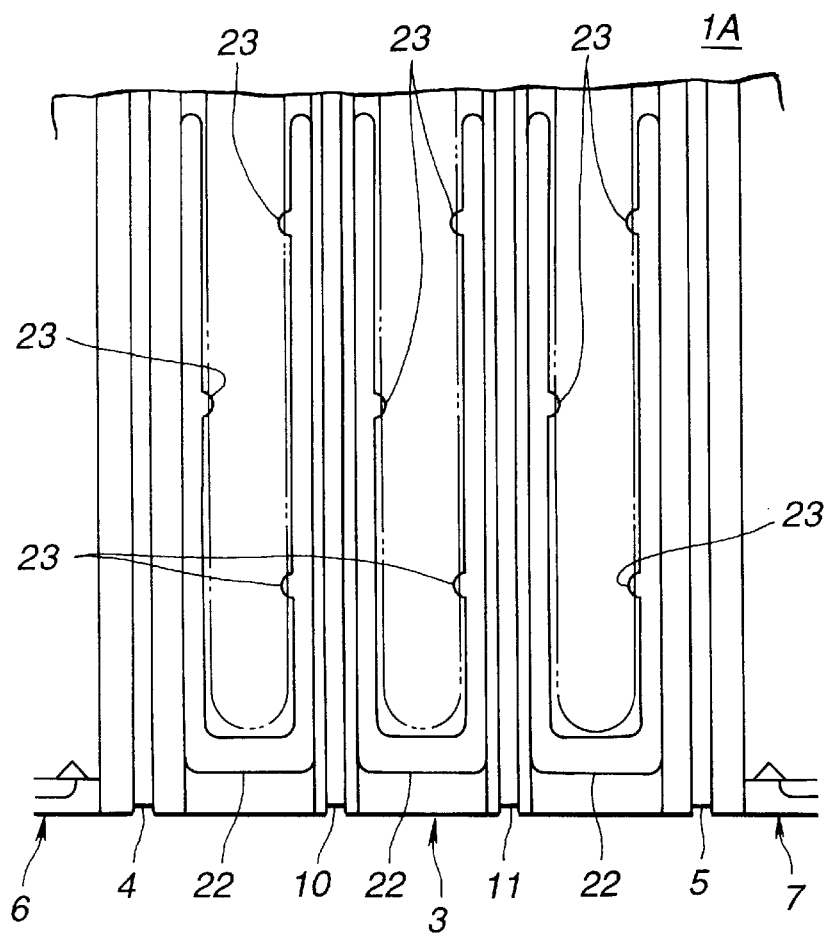
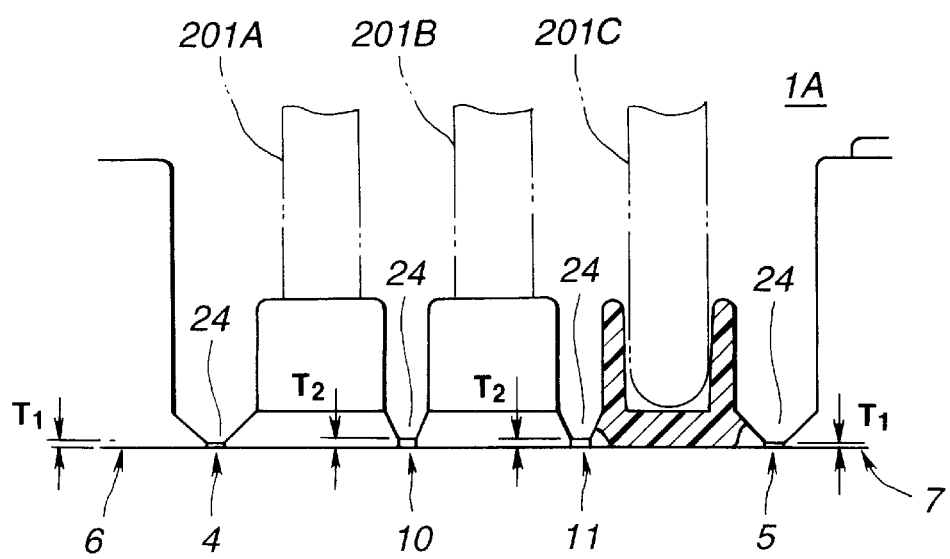

CARTRIDGE HOLDER

FIELD OF THE INVENTION

The present invention relates in general to holders for holding a plurality of cartridges, such as floppy disc cartridges or the like, and more particularly to the holders of a type which is constructed to steadily hold therein the cartridges and facilitate the work for removing the cartridges from the holder.

BACKGROUND OF THE INVENTION

In order to clarify the task of the present invention, one conventional cartridge holder will described with reference to FIGS. 52 to 57 of the accompanying drawings, which is generally designated by numeral 101. The cartridge holder 101 is constructed to hold three identical floppy disc cartridges 201A, 201B and 201C.

As is best shown in FIG. 52, the cartridge holder 101 comprises generally a pair of lid portions 106 and 107, a hinge portion 103 through which the lid portions 106 and 107 are pivotally connected, a catching portion 109 formed on a free end of the lid portion 106 and a caught portion 110 formed on a free end of the other lid portion 107. Each of the lid portions 106 and 107 is formed on an inner surface thereof with a cartridge receiving area 108 or 112 for receiving thereon the cartridge 201A or 201C. The hinge portion 103 is formed on its inner surface with a cartridge gripping part 102 for gripping a side edge of the cartridge 201B. When the lid portions 106 and 107 are pivoted about the hinge portion 103 toward each other and intimately put on each other, that is, when the case 101 assumes a closed condition, the catching and caught portions 109 and 110 become engaged to latch the closed condition of the case 101.

The cartridge gripping part 102 comprises two pairs of laterally extending parallel ridges 102a and 102b which are formed on the inner surface of the hinge portion 103 to define therebetween two aligned grooves (no numerals). The width of each groove is substantially equal to the thickness of the cartridge 201B. While, the cartridge receiving area 108 or 112 comprises first and second engaging lugs 108a and 108b (or, 112a and 112b) formed on lateral ends of the free end portion of the lid portion 106 or 107 and third and fourth engaging stubs 108c and 108d (or, 112c and 112d) formed on lateral ends of the base end portion of the lid portion 106 or 107. As is seen from FIG. 53 which is a longitudinally sectional view of the case 101, each of the first and second engaging lugs 108a and 108b (or, 112a and 112b) has in a below part thereof a gripping gap whose thickness is substantially equal to that of the cartridge 201A. While, the third and fourth engaging stubs 108c and 108d (or 112c and 112d) are spaced from the first and second engaging lugs 108a and 108b (or, 112a and 112b) by a distance corresponding to the lateral length of the cartridge 201A or 201C.

In order to put the three cartridges 201A, 201B and 201C into the cartridge holder 101, the following manual work is usually carried out. That is, in case of the cartridges 201A and 201C, as is seen from FIGS. 52 and 53, each cartridge 201A or 201C is thrust at one side edge into the gripping gaps defined by the first and second engaging lugs 108a and 108b (or, 112a and 112b) and then pressed against the inner surface of the lid portion 106 or 107 having the other side edge resiliently engaged with the third and fourth engaging stubs 108c and 108d (or, 112c and 112d). With this, the cartridges 201A and 201C are brought to their held position in the lid portions 106 and 107. In case of the center cartridge 201B, as is seen from FIG. 53, the same is thrust at one side edge into the aligned grooves defined by the two pairs of parallel ridges 102a and 102b formed on the hinge portion 103. With this, the center cartridge 201B is held by the parallel ridges 102a and 102b while standing on the hinge portion 103 with the other side edge directed upward. Then, the two lid portions 106 and 107 are pivoted about the hinge portion 103 toward each other and closely put on each other. With this, the catching portion 109 becomes engaged with the caught portion 110 to latch the two lid portions 106 and 107, that is, the cartridge holder 101 at the closed condition.

In order to open the cartridge holder 101 and remove the three cartridges 201A, 201B and 201C therefrom, the following manual work is usually needed. First, a certain force is applied to the catching portion 109 with a thumb to release the latched engagement between the catching and caught portions 109 and 110. Then, the two lid portions 106 and 107 are pivoted in their open directions as seen from FIG. 54. Then, the center cartridge 201B is pull out from the two aligned grooves of the parallel ridges 102a and 102b, and then, as is seen from FIG. 53, the inside side edge of the cartridge 201A or 201C is raised from the inner surface of the lid portion 106 or 107 to disengage from the third and fourth engaging stubs 108c and 108d (or, 112c and 112d) and pulled out from the gripping gaps defined by the first and second engaging lugs 108a and 108b (or, 112a and 112b).

However, due to the inherent construction, the abovementioned conventional cartridge holder 101 has the following drawbacks.

First, the manual work for removing the cartridges 201A and 201C from the cartridge receiving areas of the lid portions 106 and 107 is difficult or at least troublesome. That is, although the first and second engaging lugs 108a and 108b (or, 112a and 112b) and the third and fourth engaging stubs 108c and 108d (or, 112c and 112d) can tightly and assuredly hold the cartridge 201A or 201C, they fail to provide an easiness with which the cartridges 201A and 201C can be removed therefrom. That is, as is seen from FIG. 55, when a user wishes to remove the cartridge 201A from the cartridge receiving area of the lid portion 106, he or she has to pull up the inside side edge of the cartridge 201A with his or her finger "F" from the lid portion 201A against a gripping force applied thereto from the third and fourth engaging stubs 108c and 108d. However, in this case, it tends to occur that the finger "F" is injured particularly when the cartridge 201A has been tightly and assuredly held by the lid portion 106, that is, by the first, second, third and fourth engaging lugs and stubs 108a, 108b, 108c and 108d. Furthermore, due to the same reason, it tends to occur that the inside side edge of the cartridge 201A is damaged.

Second, due to the nature of plastic molding, it is difficult to provide the two aligned grooves defined by the two pairs of parallel ridges 102a and 102b with a width suitable for tightly gripping the center cartridge 201B. That is, if the width is not appropriately matched with the thickness of the cartridge 201B, it tends to occur that upon receiving a certain shock under transportation of the cartridge holder 101, the cartridge 201B comes out from the grooves. In this case, the cartridge 201B is forced to play freely in the holder 101 generating uncomfortable noises.

Third, as will be seen from FIG. 56, there is such a possibility that a shutter-mounted side of the cartridge 201B is thrust into the grooves by mistake. This thrusting tends to damage the shutter. Furthermore, as will be seen from FIG.

57, if the opposite side of the cartridge 201B, that is, the side opposite to the shutter-mounted side has been thrust into the grooves, the manual work for pulling out the cartridge 201B from the grooves has to be made by pinching and pulling out the shutter-mounted side of the cartridge 201B with fingers. Of course, this manual work tends to bring about a possibility of damaging the shutter.

DISCLOSURE OF INVENTION

According to the invention, there is provided a cartridge holder which comprises a back portion provided at an inner surface thereof with a plurality of cartridge gripping parts; a pair of lid portions pivotally connected to opposed sides of the back portion through respective major hinge portions; lock means including a catching portion provided on a free end of one of the lid portions and a caught portion provided on a free end of the other of the lid portions, the catching and caught portions being brought into engagement with each other when the lid portions are pivoted about the respective major hinge portions in a direction to close the holder; and a plurality of extra hinge portions defined by the back portion, each extra hinge portion being provided between each adjacent two of the cartridge gripping parts.

Accordingly, if the back portion is roundly flexed at the major hinge portions causing a plurality of cartridges gripped by the cartridge gripping parts to be opened like a fan, upper ends of the cartridges are separated and thus the upper ends can be easily handled by fingers of a user.

According to the invention, there is provided a cartridge holder, in which said back portion and said pair of lid portions are integrally constructed of a plastics and in which each of said major hinge portions is provided by reducing the thickness of a given part of said back portion.

Accordingly, the major hinge portions can be easily constructed and thus the cartridge holder can be economically provided.

According to the invention, there is provided a cartridge holder, in which the thickness of the major hinge portions is smaller than that of the extra hinge portions.

Accordingly, due to provision of the extra hinge portions provided between the cartridge gripping parts, handling of the lid portions can be easily made.

According to the invention, there is provided a cartridge holder, in which the thickness of the extra hinge portions increases as the position where the extra hinge portion is located nears the center of said back portion and in which the thickness of the major hinge portions is the smallest.

Accordingly, the work for flexing the back portion becomes easy.

According to the invention, there is provided a cartridge holder, in which the thickness of one of said major hinge portions is greater than that of the other of said major hinge portions.

Accordingly, the open/close movement of one of the lid portions becomes easier than that of the other lid portion. Thus, the easily movable lid portion can be used as a lid and the other lid portion can be used as a case proper.

According to the invention, there is provided a cartridge holder comprising a back portion provided at an inner surface thereof with a plurality of cartridge gripping parts, each cartridge gripping part being constructed to grip one side of a cartridge; a pair of lid portions pivotally connected to opposed sides of said back portion through respective major hinge portions; lock means including a catching portion provided on a free end of one of said lid portions and a caught portion provided on a free end of the other of said lid portions, said catching and caught portions being brought into engagement with each other when said lid portions are pivoted about the respective major hinge portions in a direction to close the holder; and cartridge retaining ribs formed on respective bottom walls of the pair of lid portions, each rib having a stopper edge for stopping displacement of the cartridge in a direction from the corresponding cartridge gripping part.

Accordingly, even when the cartridge holder is under movement having vibration and shock applied thereto, it never occurs that the cartridges are released from the cartridge gripping parts.

According to the invention, there is provided a cartridge holder, in which each of said cartridge retaining ribs is so positioned that when the lid portions are about to assume their closed positions with the cartridge being improperly gripped by the corresponding cartridge gripping part in the holder, an upper end of the cartridge retaining rib abuts against a major surface of the cartridge.

Accordingly, in case wherein the cartridge is held in the cartridge holder having its shorter side gripped by the cartridge gripping parts, closing movement of the lid portion induces a contact of the cartridge retaining ribs of the lid portion with upper or lower surface of the cartridge teaching that the cartridge is improperly set in the cartridge holder. Thus, users can notice such improper setting of the cartridge.

According to the invention, there is provided a cartridge holder, in which each of said cartridge retaining ribs has a seating rib which is so positioned that when the lid portions assume their closed positions with the cartridge properly installed therein, the seating rib puts thereon a major surface of said cartridge.

Accordingly, when the cartridge having its one side gripped by the cartridge gripping parts is put on an inner surface of the lid portion, the other side of the cartridge is put on the seating rib and thus held above the inner surface of the lid portion keeping a certain clearance therebetween. Accordingly, vibration and shock applied from the outside of the cartridge holder are not directly led to the cartridge.

According to the invention, there is provided a cartridge holder, in which the thickness of said seating rib is greater than the thickness of a card which is received on the bottom wall of the lid portion, and in which the thickness of said seating rib is so determined as to level the cartridge which has been gripped by the corresponding cartridge gripping part.

Accordingly, when the cartridge holder is put on a horizontal place such as the upper surface of a table or disc, the cartridge held by the cartridge holder is also held horizontally, that means that there is produced no force that forces the cartridge to escape from the cartridge gripping parts. Furthermore, the card put on the inner surface of the lid portion can be supported without contacting the cartridge.

According to the invention, there is provided a cartridge holder, in which the seating rib is integrally connected to a lower end of the cartridge retaining rib.

Since the seating rib and the cartridge retaining rib are integral with each other, formation of them is easily carried out. Furthermore, due to provision of the seating rib, the lower end portion of the cartridge retaining rib is reinforced.

According to the invention, there is provided a cartridge holder, in which one of said pair of lid portions is provided at its inner side with at least one stopper at a position near the corresponding major hinge portion for suppressing movement of the card toward said major hinge portion.

Accordingly, undesired phenomenon wherein the card is shifted to the major hinge portion to lower the hinge function of the major hinge portion is prevented.

According to the invention, there is provided a cartridge holder, in which said catching portion comprises a pawl member projected from the free end of one of the lid portions, and in which said caught portion comprises a recess formed in an inside surface of a projection projected from the free end of the other of the lid portions.

Accordingly, when the paired lid portions are closed, the catching portion and the caught portion become engaged with each other thereby locking the closed condition of the lid portions.

According to the invention, there is provided a cartridge holder comprising a back portion provided at an inner surface thereof with a plurality of cartridge gripping parts, each cartridge gripping part being constructed to grip one side of a cartridge; a pair of lid portions pivotally connected to opposed sides of said back portion through respective major hinge portions; lock means including a catching portion provided on a free end of one of said lid portions and a caught portion provided on a free end of the other of said lid portions, said catching and caught portions being brought into engagement with each other when said lid portions are pivoted about the respective major hinge portions in a direction to close the holder; a plurality of extra hinge portions defined by said back portion, each extra hinge portion being provided between each adjacent two of said cartridge gripping parts; and a swell-out suppressing means for suppressing a swell-out movement of said back portion when said lid portions are pivoted about the respective major hinge portions in a direction to close the holder.

Accordingly, undesired swell-out phenomenon of the back portion, which would occur when the paired lid portions are closed, is prevented.

According to the invention, there is provided a cartridge holder, in which said swell-out suppressing means comprises a clearance holding rib which is resiliently compressed between adjacent two of the cartridge gripping parts when the lid portions are pivoted in the closing direction.

Accordingly, due to provision of the clearance holding rib, the clearance between the cartridge gripping parts of the back portion can be kept greater than a given value and thus the swell-out phenomenon of the back portion can be prevented.

According to the invention, there is provided a cartridge holder, in which said swell-out suppressing means comprises a projection formed on one of the lid portion and the cartridge gripping part; and a recess formed on the other of the lid portion and the cartridge gripping part, wherein when the lid portions are pivoted in the closing direction, said projection is brought into engagement with the recess to achieve a tight connection therebetween.

Accordingly, undesired swell-out phenomenon of the back portion, which would occur when the paired lid portions are closed, is prevented.

According to the invention, there is provided a cartridge holder, in which said projection is formed on an inner surface of one side wall of the lid portion near the corresponding major hinge portion, and in which said recess is formed on a longitudinal end of the cartridge gripping part.

Accordingly, engagement between the projection and the recess becomes assured and thus the swell-out phenomenon of the back portion is assuredly prevented.

According to the invention, there is provided a cartridge holder, in which said projection has a spherical head and is formed on an inner surface of one side wall of the lid portion near the corresponding major hinge portion, and in which said recess is a groove provided by a longitudinal end of the cartridge gripping part.

Accordingly, the spherical head can be smoothly engaged with the recess thereby assuredly preventing the swell-out phenomenon of the back portion.

According to the invention, there is provided a cartridge holder, in which the longitudinal end of said cartridge gripping part is formed above the groove with an inclined surface on which said projection slides, and in which said groove has an engaging surface with which said projection is engageable.

Accordingly, due to provision of the inclined surface, the movement of the projection toward the groove is smoothly carried out.

According to the invention, there is provided a cartridge holder, in which the longitudinal end of said cartridge gripping part is formed above the recess with an inclined surface on which said projection slides.

Accordingly, due to provision of the inclined surface, the movement of the projection toward the groove is smoothly carried out.

According to the invention, there is provided a cartridge holder, in which the longitudinal end of said cartridge gripping part is formed above the groove with an inclined surface on which said projection slides.

Accordingly, due to provision of the inclined surface, the movement of the projection toward the groove is smoothly carried out.

BRIEF DESCRIPTION OF THE DRAWINGS

FIG. 5 is an enlarged plan view of the portion indicated by an arrow "V" of FIG. 1;

FIG. 6 is an enlarged sectional view of the portion indicated by the arrow "V" of FIG. 1;

PREFERRED EMBODIMENTS OF THE INVENTION

Figure 1:
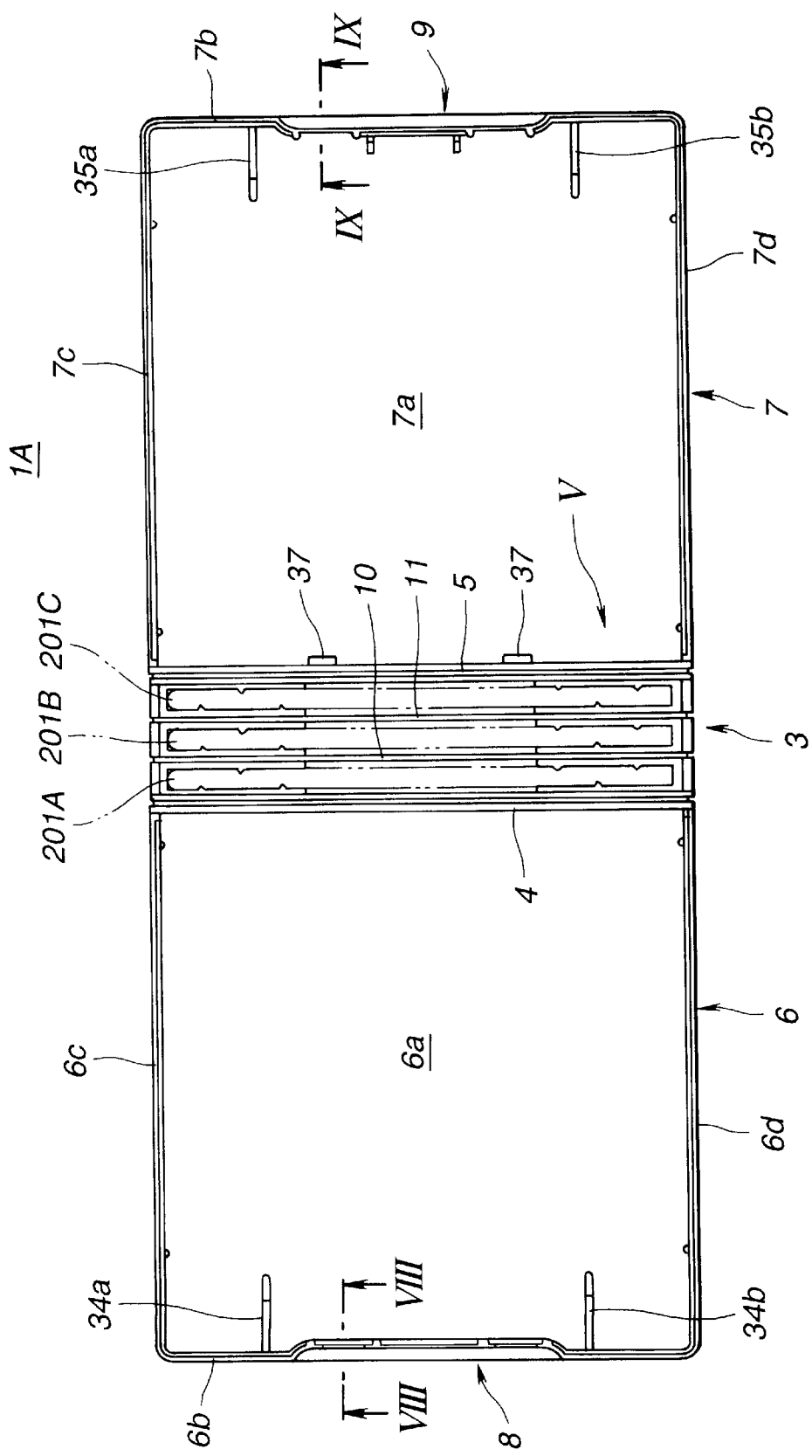
FIG. 1 is a plan view of a cartridge holder of a first embodiment of the present invention.
Figure 2:
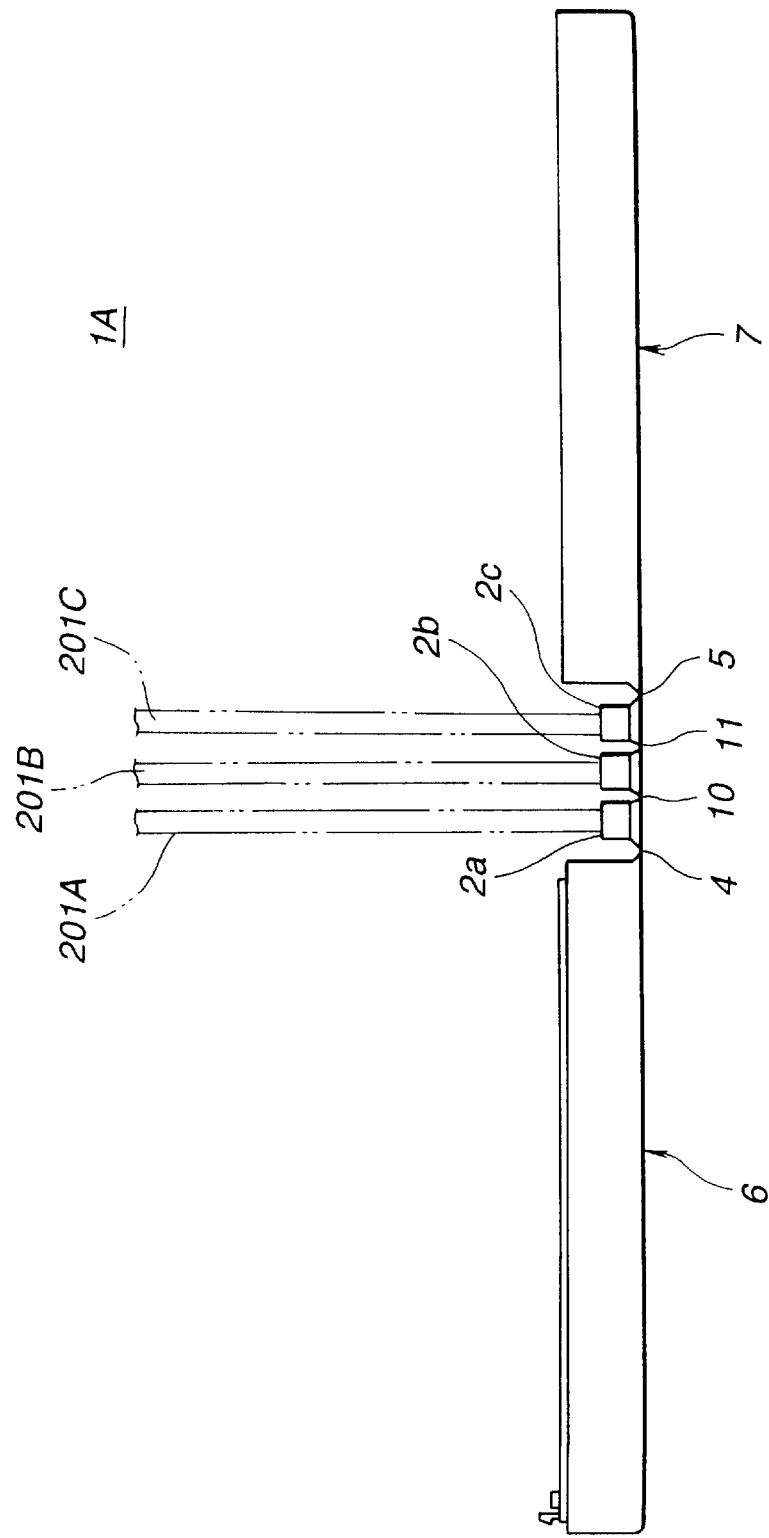
FIG. 2 is a front view of the cartridge holder of the first embodiment.
Figure 3:
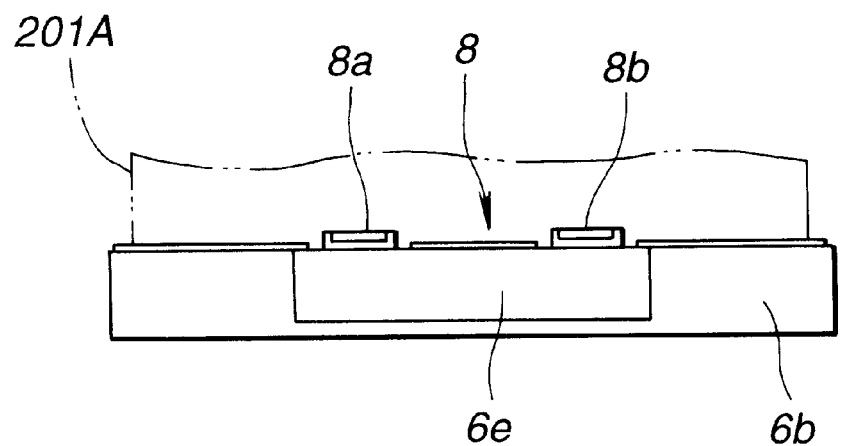
FIG. 3 is a left side view of the cartridge holder of the first embodiment.
Figure 4:
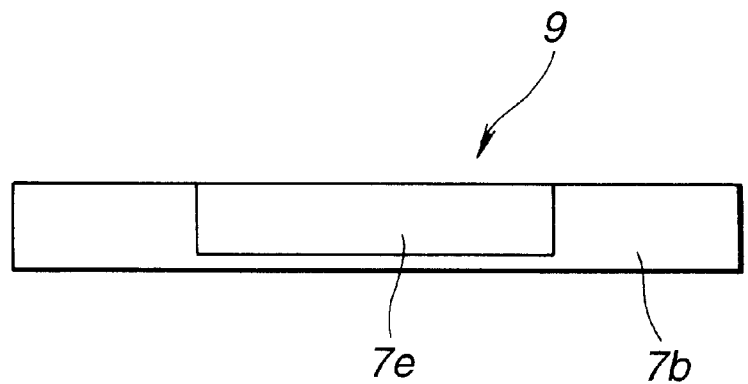
FIG. 4 is a right side view of the cartridge holder of the first embodiment.
Figure 7:
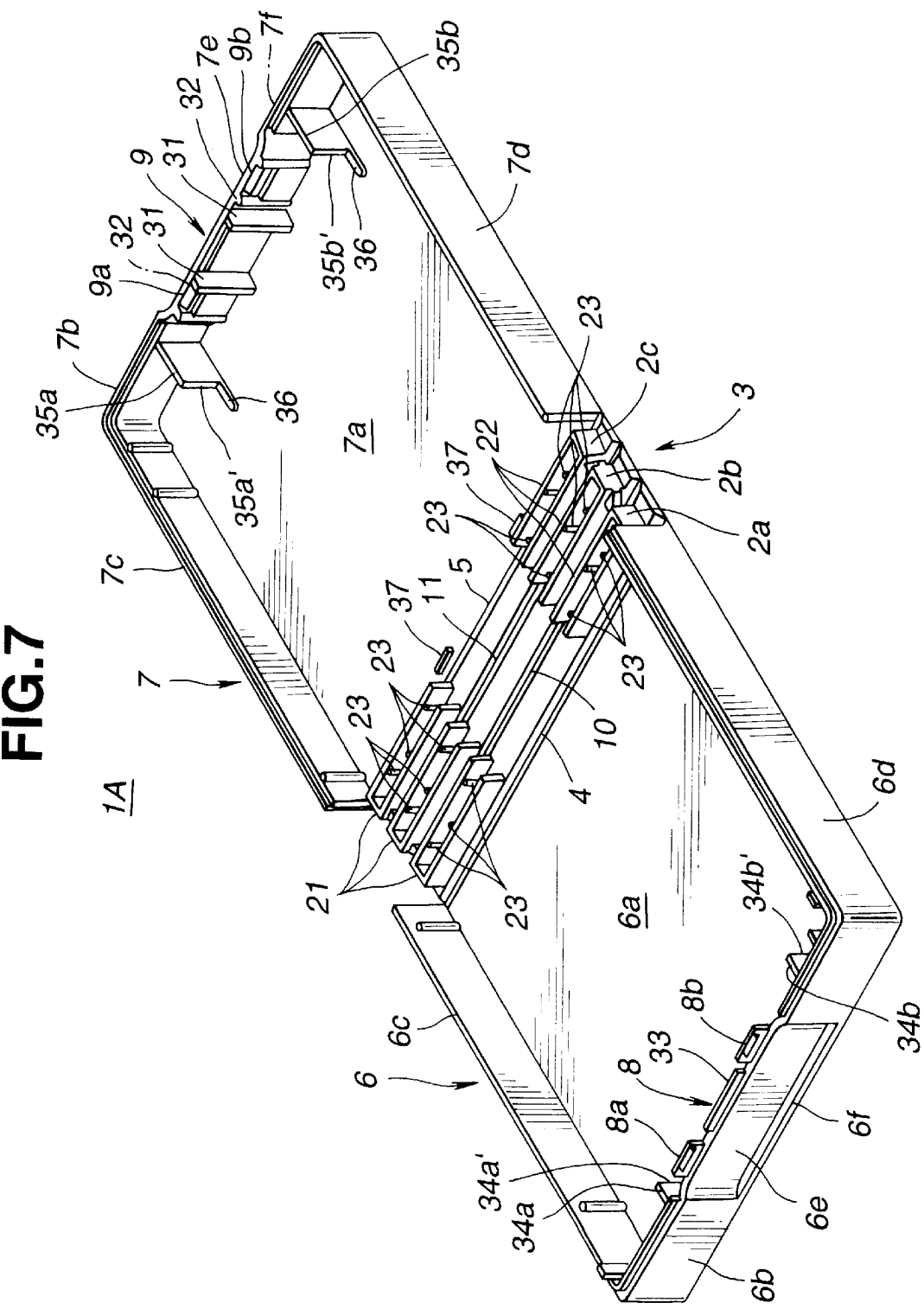
FIG. 7 is a perspective view of the cartridge holder of the first embodiment.

Referring to FIGS. 1 to 15, particularly FIGS. 1 and 7, there is shown a cartridge holder 1A of a first embodiment of the present invention, which is made of a molded plastic and constructed to hold three floppy disc cartridges 201A, 201B and 201C.

As is best seen from FIG. 7, the cartridge holder 1A of this embodiment comprises generally a pair of lid portions 6 and 7, a back portion 3 having on its inner surface first, second and third cartridge gripping parts 2a, 2b and 2c, first and second outside hinge portions 4 and 5 through which the lid portions 6 and 7 are pivotally connected to the back portion 3, a catching portion 8 formed on a free end of the lid portion 6 and a caught portion 9 formed on a free end of the other lid portion 7.

The back portion 3 has further a third inside hinge portion 10 through which the first and second cartridge gripping parts 2a and 2b are pivotally connected and a fourth inside hinge portion 11 through which the second and third cartridge gripping parts 2b and 2c are pivotally connected. As shown, the first, second, third and fourth hinge portions 4, 5, 10 and 11 extend in parallel.

Each of the cartridge gripping parts 2a, 2b and 2c comprises a pair of U-shaped projections 21 and 22 which are aligned and arranged to have inside open ends of their respective grooves directed toward each other. Each of the U-shaped projections 21 and 22 comprises two parallel walls and one connecting wall by which the parallel walls are connected to define the groove. The two parallel walls have on their inner surfaces biasing ridges 23 which extend perpendicular to a major surface of the back portion 3. As is best shown in FIG. 5, the biasing ridges 23 are alternately positioned on the parallel walls and each biasing ridge 23 has a semicircular cross section. It is to be noted that each biasing ridge 23 is so sloped that the projection degree thereof gradually increases as the position nears the bottom of the groove. This is because of assuredly gripping the side edge of each cartridges 201A, 201B or 201C, as will become apparent as the description proceeds.

As is seen from FIG. 6, each of the first, second, third and fourth hinge portions 4, 5, 10 and 11 is provided by providing the back portion 3 with a thinner portion 24 which has a generally V-shaped cross section as shown. It is to be noted that the thickness "T1" of the first hinge portion 4 is substantially the same as that of FIG. 2, and the thickness "T2" of the third hinge portion 10 is substantially the same as that of the fourth hinge portion 11, and the thickness "T1" is smaller than the thickness "T2", as shown. This means that the first and second hinge portions 4 and 5 are more flexible than the third and fourth hinge portions 10 and 11.

As is best seen from FIG. 7, each of the lid portions 6 and 7 comprises a rectangular bottom wall 6a or 7a, a top wall 6b or 7b formed on a free end of the bottom wall 6a or 7a, and two side walls 6c and 6d (or, 7c and 7d) formed on laterally opposed ends of the bottom wall 6a or 7a. That is, by the bottom wall, top wall and the two side walls, each lid portion 6 or 7 defines a rectangular receiving recess for receiving the cartridge 201A or 201C.

As is seen in FIG. 7, a middle portion 6e or 7e of the top wall 6b or 7b of the lid portion 6 or 7 is depressed. With this depression 6e or 7e, a so-called "finger hooking edge" 6f or 7f is defined. That is, when it is needed to open the cartridge holder 1A, a user puts his or her fingers to the finger hooking edges 6f and 7f for facilitating the work for opening the holder 1A.

Figure 8:
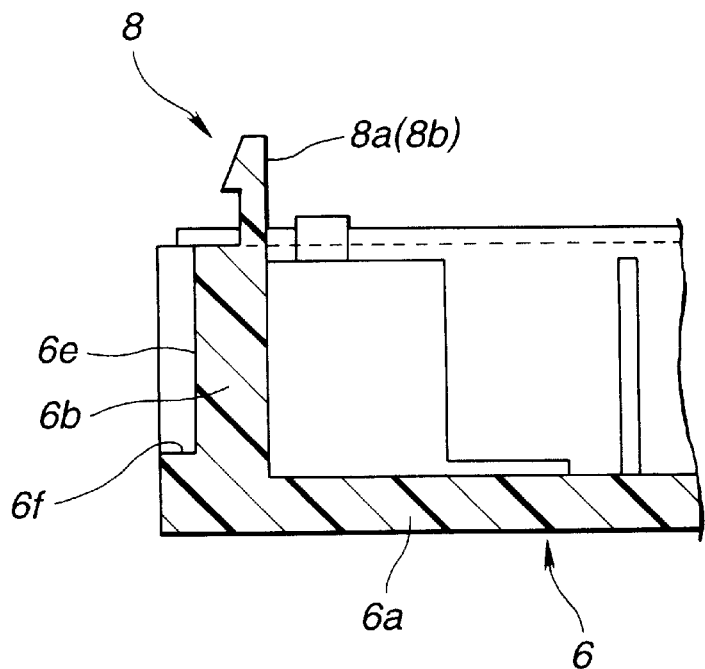
FIG. 8 is an enlarged sectional view taken along the line VIII—VIII of FIG. 1.

As is seen from FIGS. 7 and 8, the top wall 6b of the lid portion 6 is formed with the catching portion 8. The catching portion 8 comprises two identical pawl members 8a and 8b each including a projection which projects upward from the top wall 6b and a pawl which is formed on the projection and projected outward.

Figure 9:
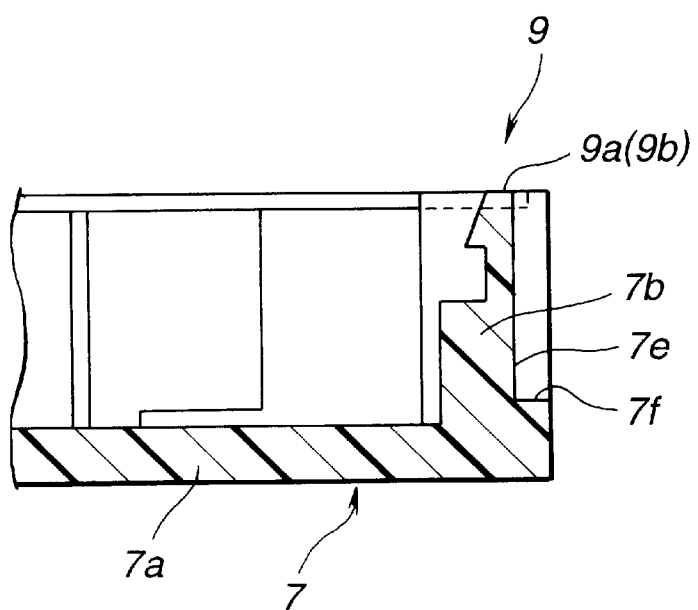
FIG. 9 is an enlarged sectional view taken along the line IX—IX of FIG. 1.

As is seen from FIGS. 7 and 9, the top wall 7b of the other lid portion 7 is formed with the caught portion 9. The caught portion 9 comprises two identical recessed members 9a and 9b each including a projection which projects upward from the top wall 7b and a recess which is formed in an inside surface of the projection.

Figure 10:
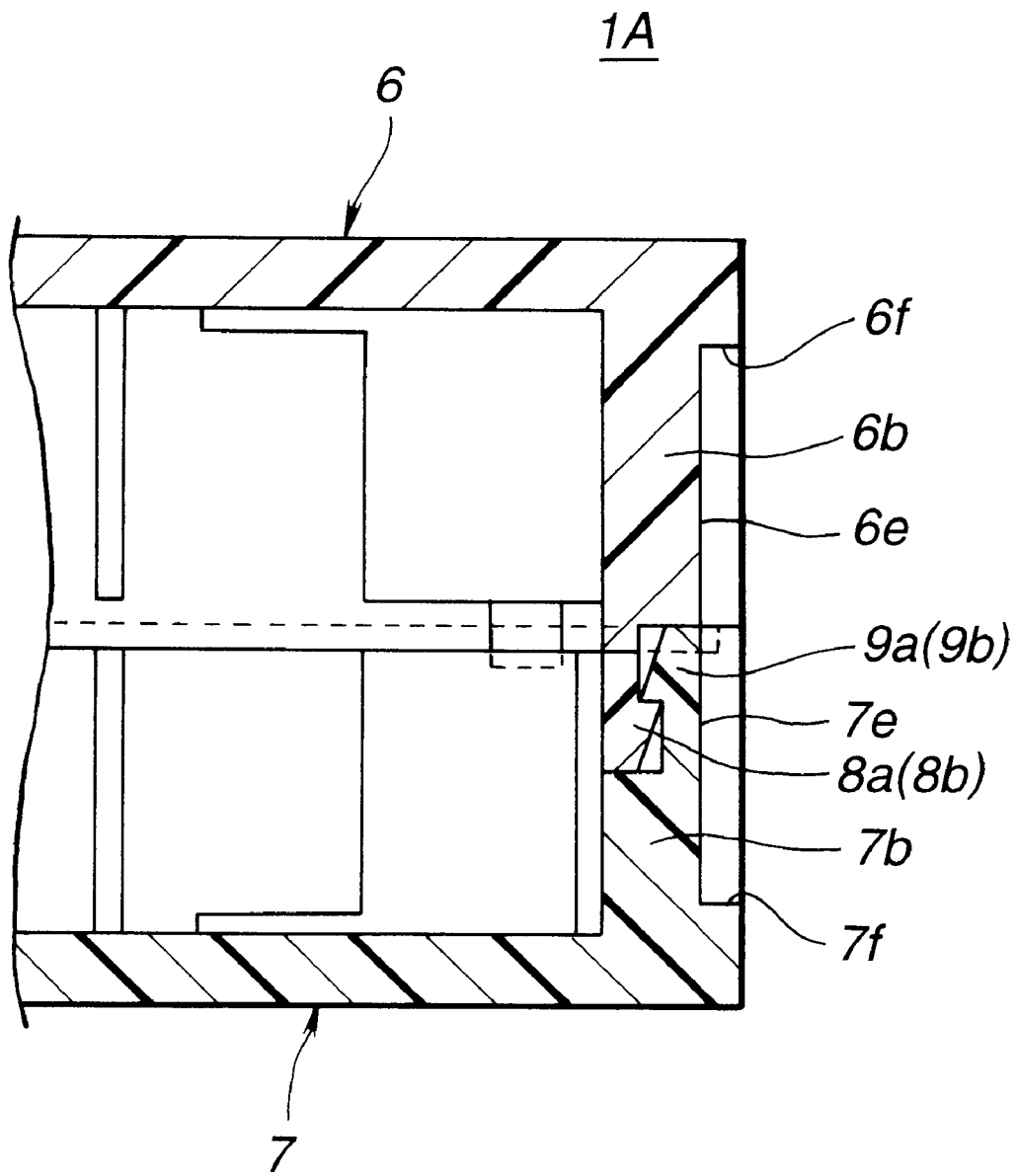
FIG. 10 is an enlarged, partial and sectional view of the cartridge holder of the first embodiment in a locked condition.
Figure 11:
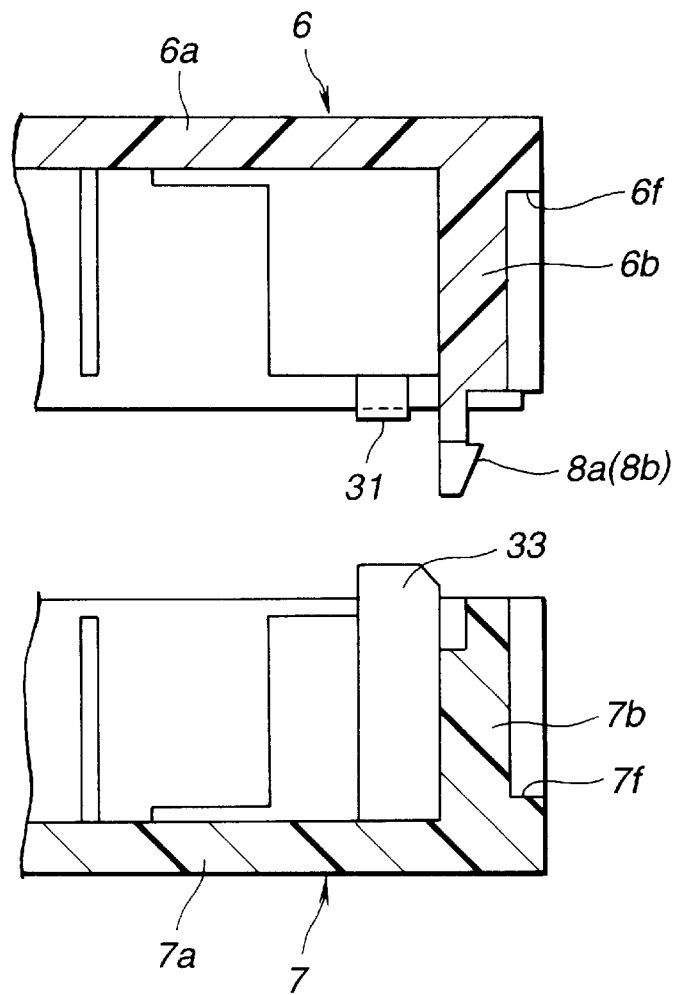
FIG. 11 is an enlarged, partial and sectional view of the cartridge holder of the first embodiment, showing first and third positioning projections.
Figure 12:
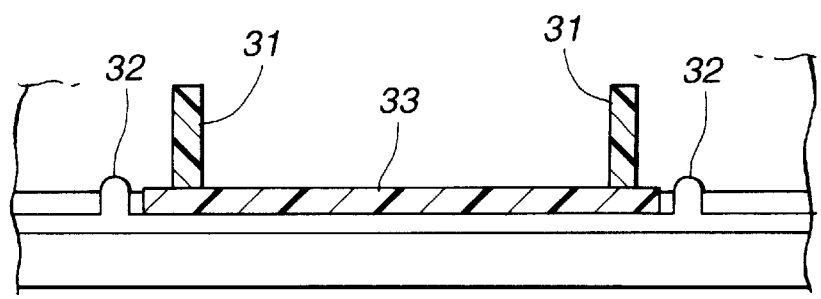
FIG. 12 is an enlarged, partial and sectional view of the cartridge holder of the first embodiment, showing second and third positioning projections.

As is seen from FIG. 10, when the lid portion 6 is properly put on the other lid portion 7, the catching portion 8 (viz., the pawl members 8a and 8b) of the lid portion 6 latchingly catches the caught portion 9 (viz., recessed members 9a and 9b) of the other lid portion 7. It is now to be noted that when, under this latched condition, the top wall 6b of the lid portion 6 is depressed by a certain force, the latched engagement between the two portions 8 and 9 becomes cancelled, which permits opening of the cartridge holder 1A.

Referring back to FIG. 7, the top wall 7b of the lid portion 7 is formed with a first pair of positioning projections 31 and 31 s and a second pair of positioning projections 32 and 32, and the top wall 6b of the lid portion 6 is formed with a positioning rib 33. As is seen from FIGS. 11 and 12, when the lid portion 6 is properly put on the other lid portion 7 for closing the cartridge holder 1A, the first projections 31 and 31 abut on the positioning rib 33 and the second projections 32 and 32 put therebetween the positioning rib 33, which assures relative positioning between the two lid portions 6 and 7.

Referring back to FIG. 7, each of the lid portions 6 and 7 is formed at a free end portion thereof a pair of cartridge retaining ribs 34a and 34b (or, 35a and 35b) which project inward from the corresponding top wall 6b or 7b. Each cartridge retaining rib 34a, 34b, 35a or 35b has a stopper edge 34a', 34b', 35a' or 35b' against which an outside side edge of the cartridge 201A or 201C abuts when the cartridge is properly received in the rectangular receiving recess of the lid portion 6 or 7. That is, the cartridge retaining ribs function to assuredly retain the cartridges 201A and 201C in the rectangular receiving recesses of the lid portions 6 and 7.

In the following, operation of the cartridge holder 1A will be described with reference to the drawings.

Figure 13:
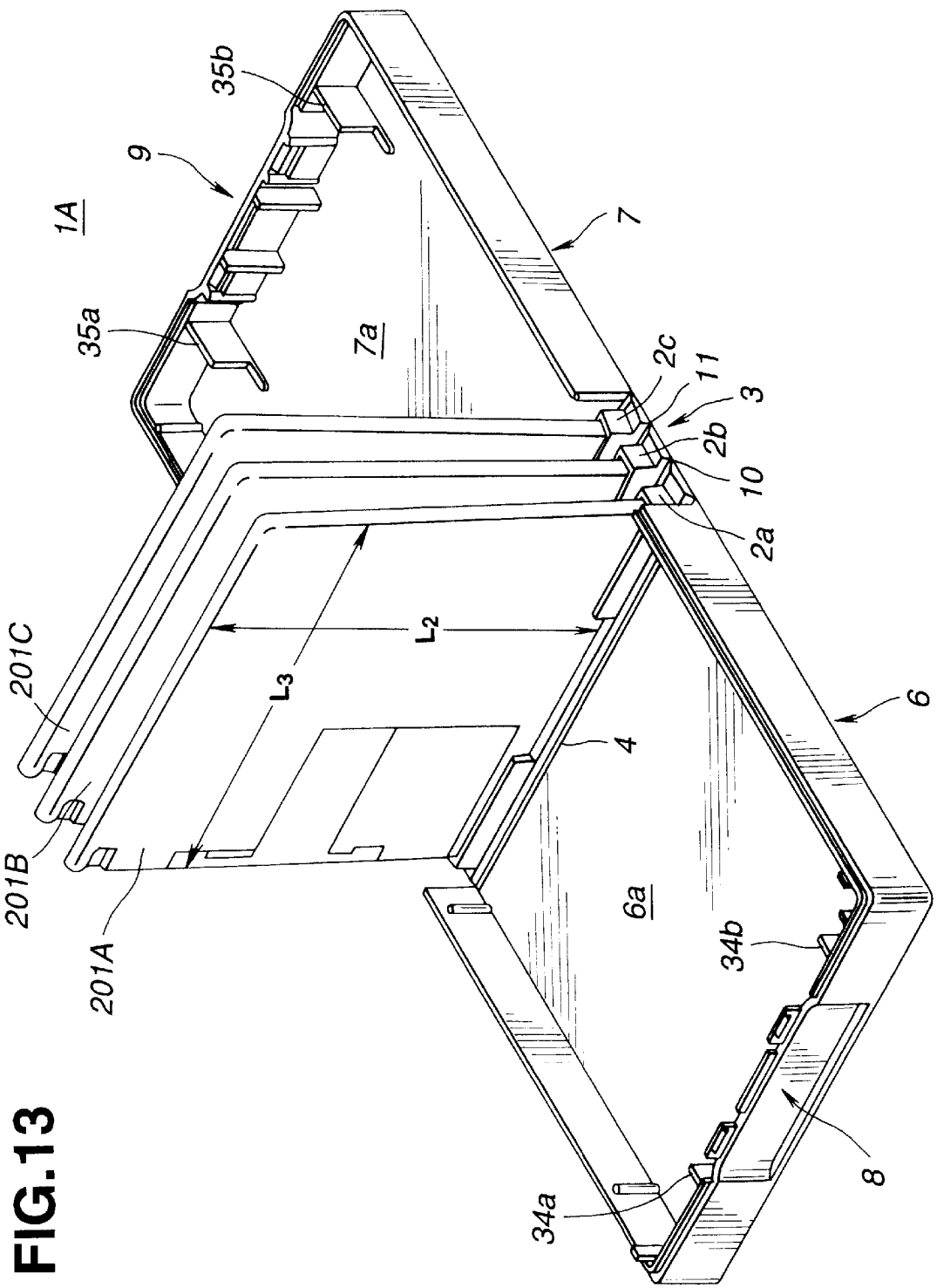
FIG. 13 is a perspective view of the cartridge holder of the first embodiment, with three cartridges held thereby.

For ease of understanding, the description will be commenced with respect to the open condition of the cartridge holder 1A, that is, the condition as shown in FIGS. 7 and 13.

Figure 14:
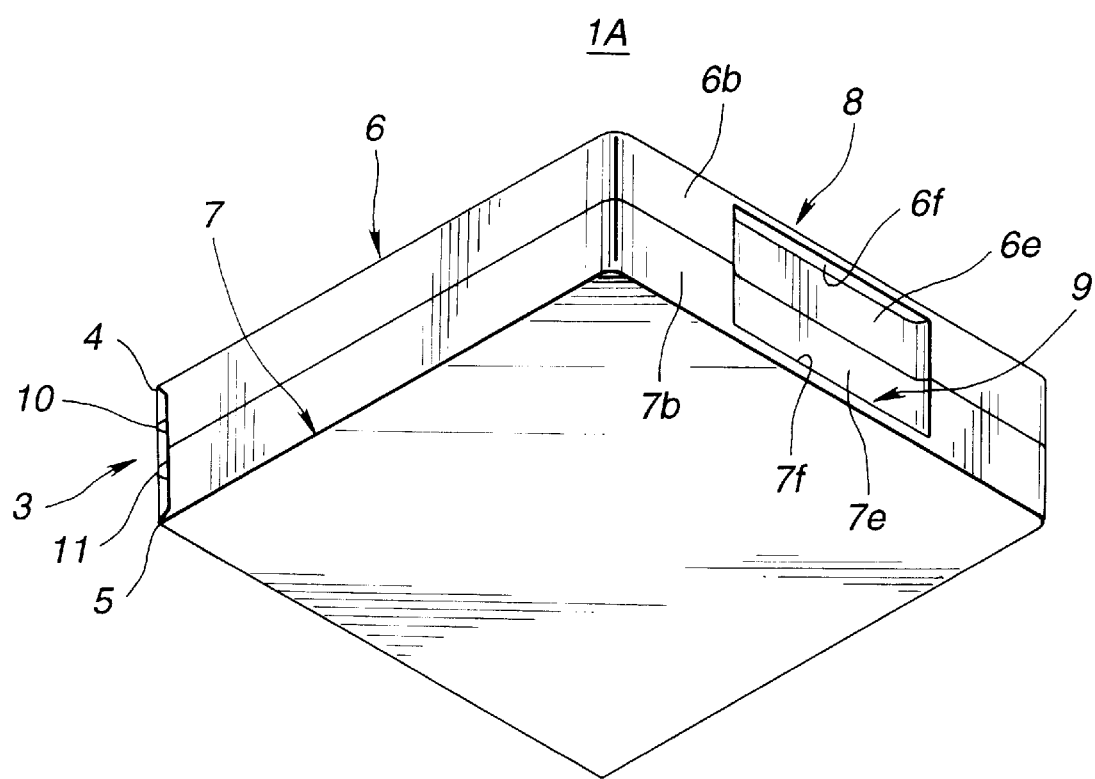
FIG. 14 is a perspective view of the cartridge holder of the first embodiment in a closed and locked condition.

As is seen from FIG. 13, first, the three cartridges 201A, 201B and 201C are brought to the back portion 3 of the holder 1A and the inside side edges of the cartridges are thrust into the first, second and third cartridge gripping parts 2a, 2b and 2c respectively. Due to provision of the biasing ridges 23 in the gripping parts 2a, 2b and 2c, the cartridges 201A, 201B and 201C are tightly held by the parts 2a, 2b and 2c. Then, the two lid portions 6 and 7 are pivoted up about the first and second hinge portions 4 and 5 of the back portion 3 respectively, so that the lid portions 6 and 7 are put on each other, as is shown in FIG. 14. Upon this, the catching portion 8 and the caught portion 9 become latchingly engaged. Under this latched condition, the three cartridges 201A, 201B and 201C are tightly held in the holder 1A with their outside side edges restrained by the retaining ribs 34a, 34b, 35a and 35b.

For removing the cartridges 201A, 201B and 201C from the closed holder 1A, the following steps take place.

First, in order to open the holder 1A, thumbs of left and right hands of a user are put onto the depressed portions 6e and 7e (see FIG. 14) of the top walls 6b and 7b of the lid portions 6 and 7, and then using the left and right thumbs, a certain force is applied to the top walls 6b and 7b in a direction to separate them away from each other with the depressed portion 6e pressed by the left thumb. With this, the latched engagement between the catching and caught portions 8 and 9 becomes released and thus the lid portions 6 and 7 are permitted to pivot about the first and second hinge portions 4 and 5 in a direction to open the holder 1A. With this, the holder 1A becomes opened as shown in FIG. 15 having the three cartridges 201A, 201B and 201C exposed.

Figure 15:
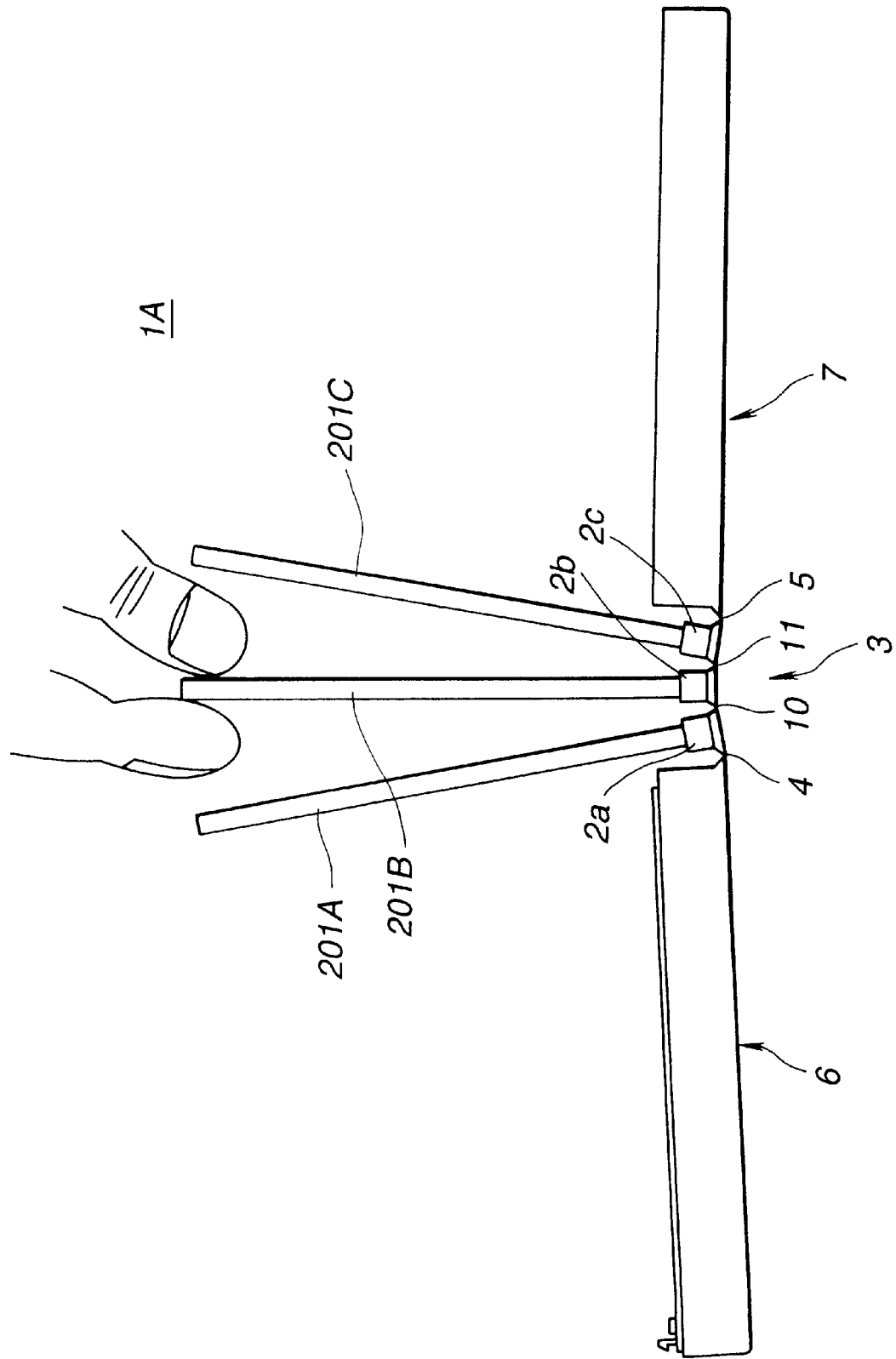
FIG. 15 is a view similar to FIG. 2, but showing an advantage given to the cartridge holder of the first embodiment.

When now, as is shown in FIG. 15, the center cartridge 201B is picked up with the fingers of the user, the other two cartridges 201A and 201C are pivoted outward due to the function of the first, third, fourth and second hinge portions 4, 10, 11 and 5 defined by the back portion 3, so that the other two cartridges 201A and 201C are spaced from the center cartridge 201B. As is understood from this drawing, under this condition, handling of all the three cartridges 201A, 201B and 201C is very easy and thus removing of them from the respective gripping portions 2a, 2b and 2c is easily achieved. This is an important advantage possessed by the first embodiment 1A.

Figure 16:
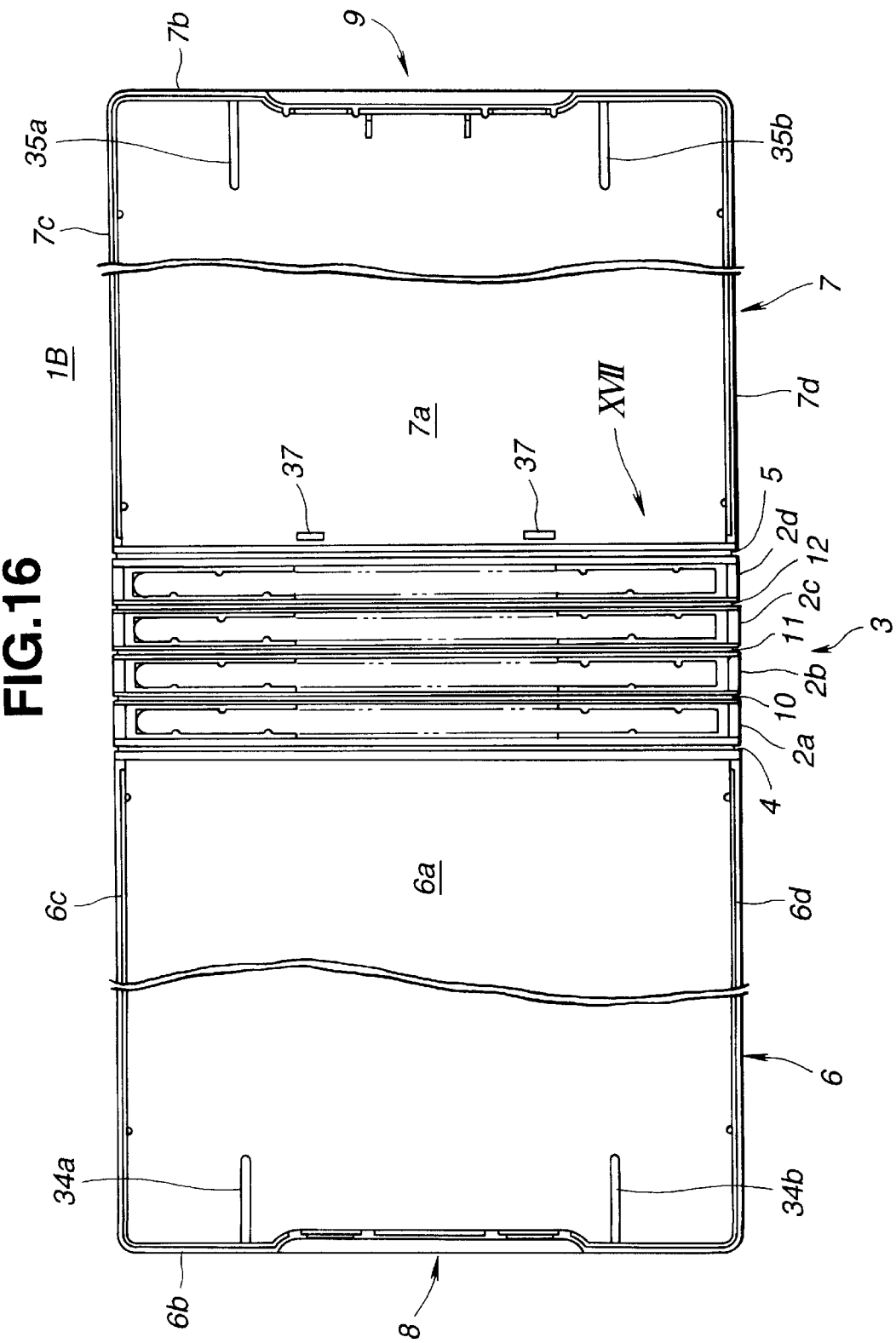
FIG. 16 is a plan view of a cartridge holder of a second embodiment of the present invention.
Figure 17:
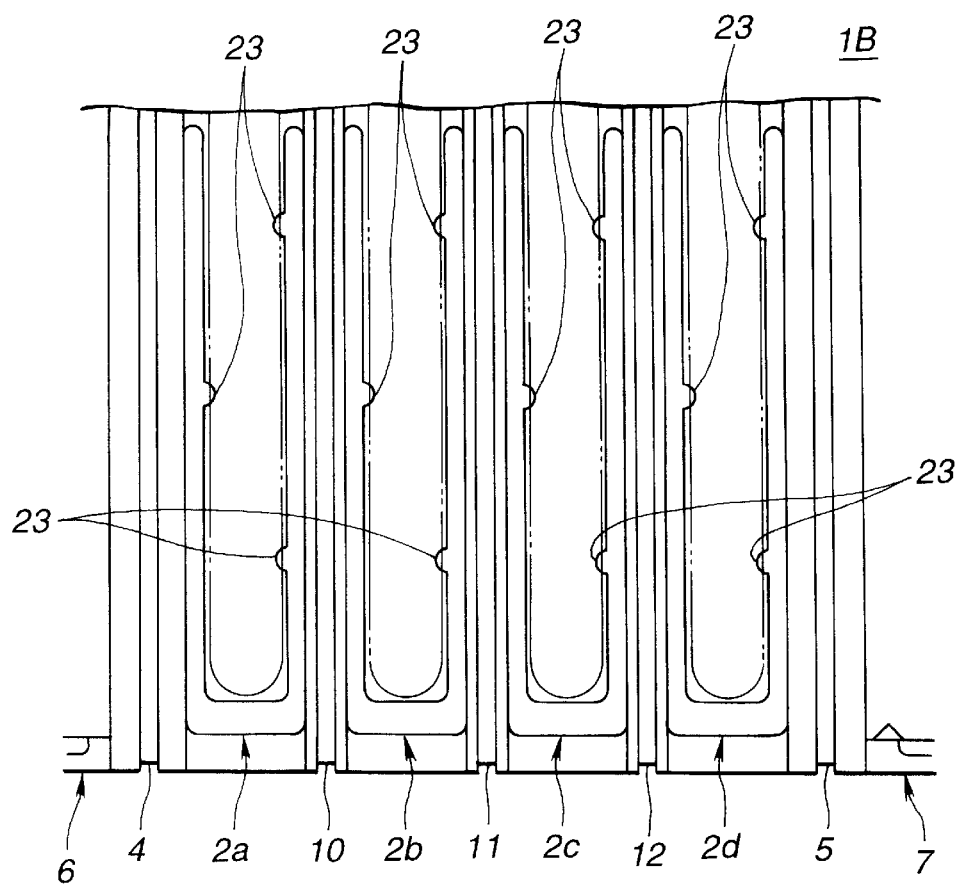
FIG. 17 is an enlarged plan view of the portion indicated by an arrow "XVII" of FIG. 16.
Figure 18:
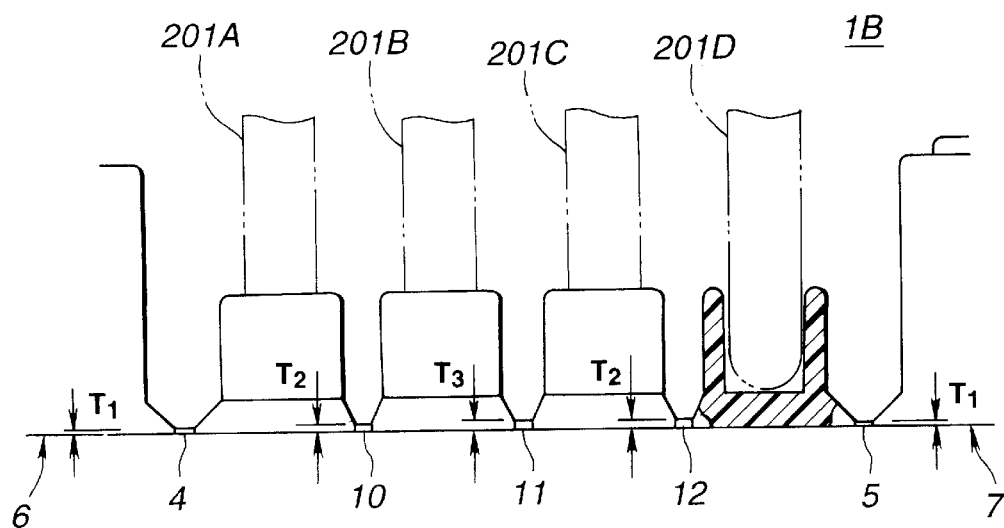
FIG. 18 is an enlarged sectional view of the portion indicated by the arrow "XVII" of FIG. 16.
Figure 19:
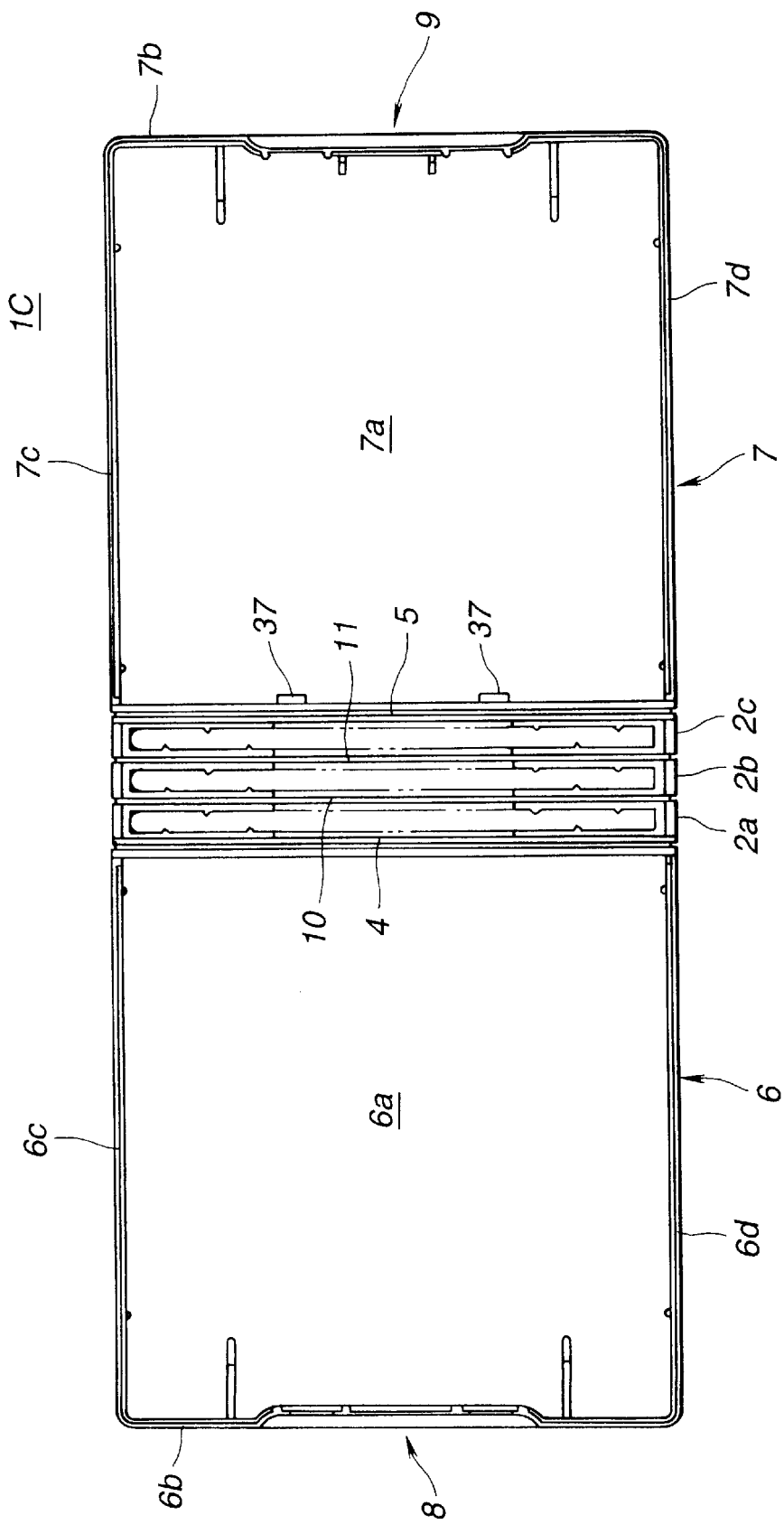
FIG. 19 is a plan view of a cartridge holder of a third embodiment of the present invention.
Figure 20:
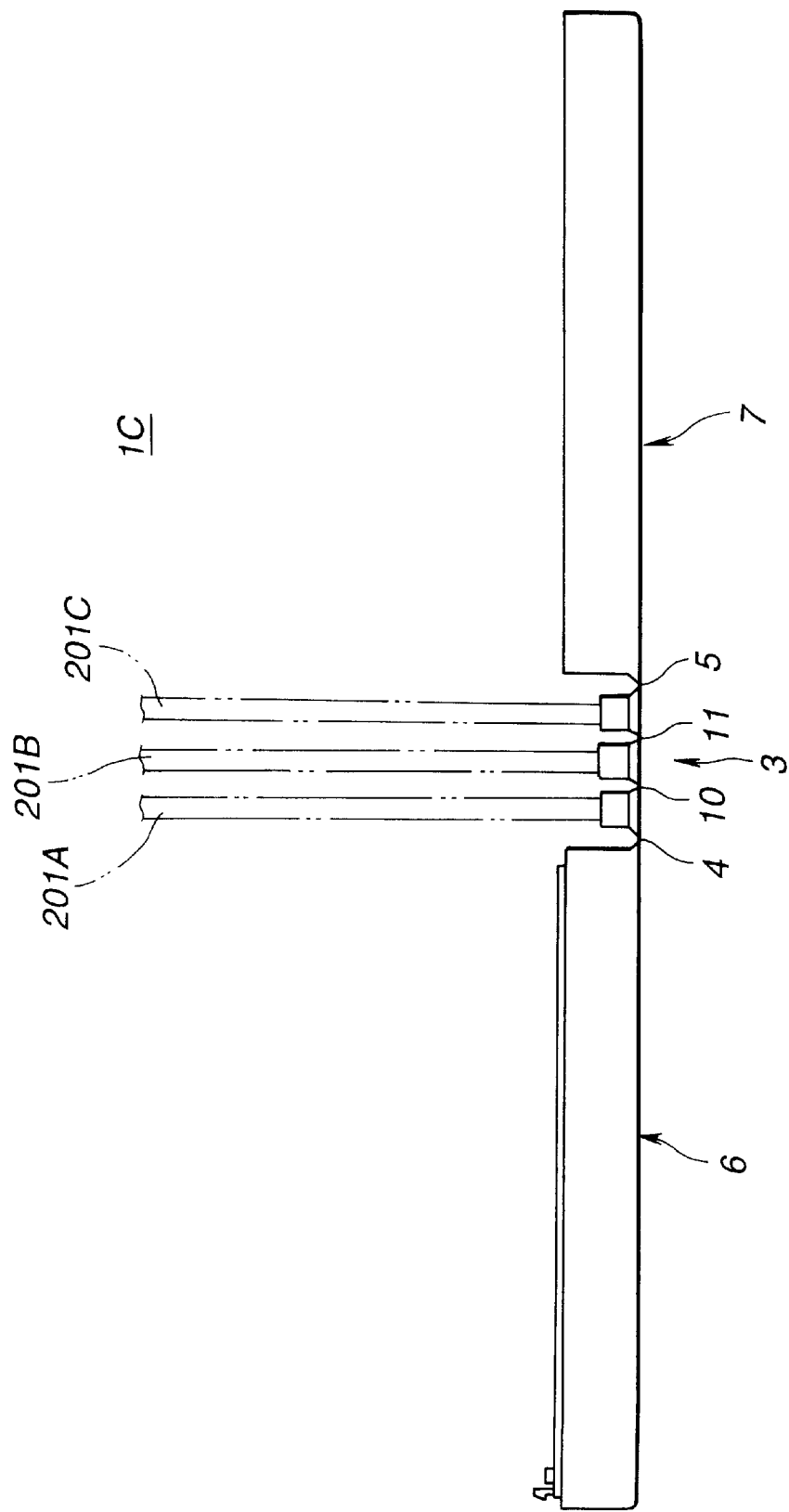
FIG. 20 is a front view of the cartridge holder of the third embodiment.

Referring to FIGS. 16 to 18, there is shown a cartridge holder 1B of a second embodiment of the present invention.

As is seen from FIG. 16, the cartridge holder 1B of this second embodiment is substantially the same as that 1A of the first embodiment except that in the second embodiment 1B, four, that is, first, second, third and fourth cartridge gripping parts 2a, 2b, 2c and 2d are defined. Due to addition of the fourth cartridge gripping part 2d, a fifth hinge portion 12 is defined on the back portion 3 between the third and fourth cartridge gripping parts 2c and 2d.

As is seen in FIG. 18, in the second embodiment 1B, the thickness "T1" of the first and second hinge portions 4 and 5 is smaller than the thickness "T2" of the third and fifth hinge portions 10 and 12, and the thickness "T2" is smaller than the thickness "T3" of the fourth hinge portion 11. That is, an inequality "Ti<T2<T3" is established.

Substantially the same advantage as the above-mentioned first embodiment 1A is obtained in this second embodiment 1B.

Referring to FIGS. 19 to 23, there is shown a cartridge holder 1C of a third embodiment of the present invention.

Since the cartridge holder 1C of this third embodiment is similar in construction to that 1A of the above-mentioned first embodiment, only parts and construction which are different from those of the first embodiment 1A will be described in the following.

That is, in this third embodiment, the cartridge retaining ribs 34a, 34b, 35a and 35b formed on the lid portions 6 and 7 are improved in construction.

Figure 21:
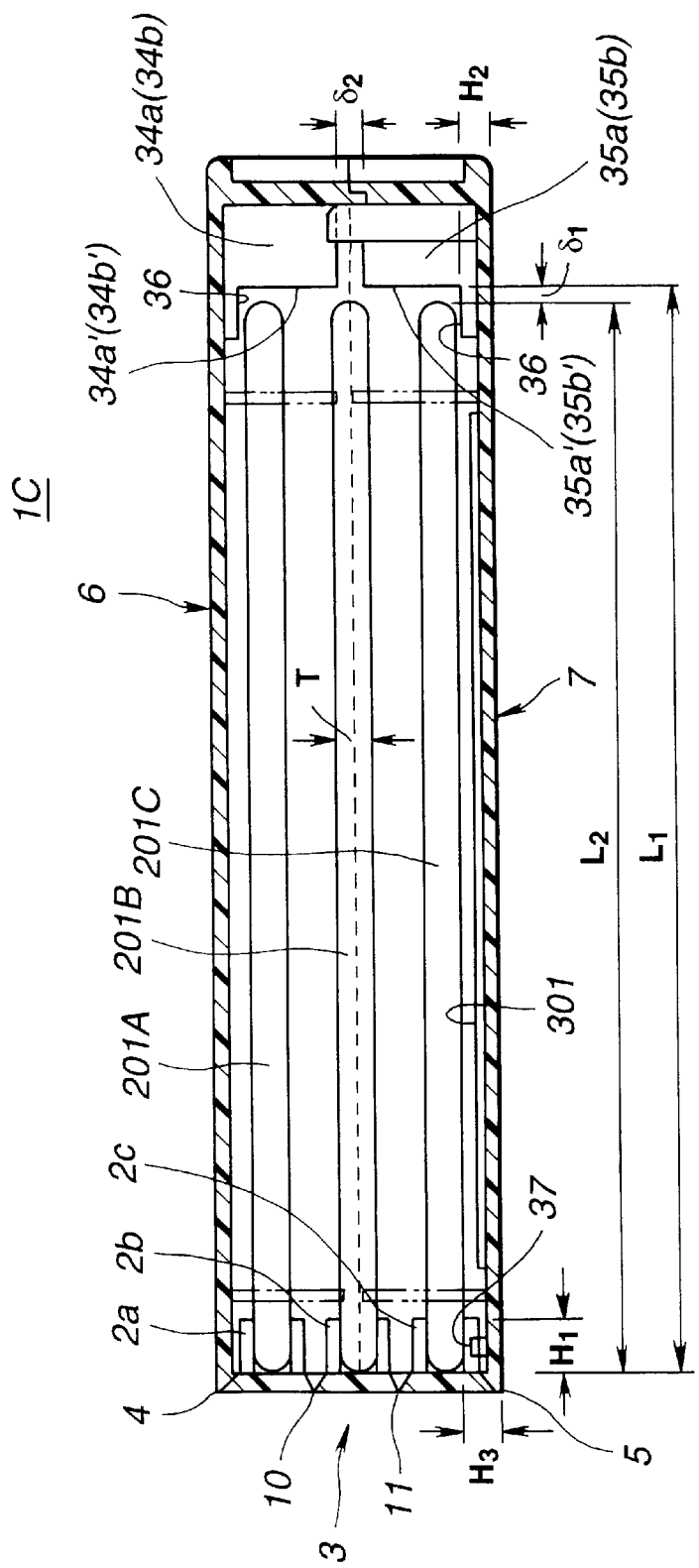
FIG. 21 is a sectional view of the cartridge holder of the third embodiment in a closed and locked condition.
Figure 22:
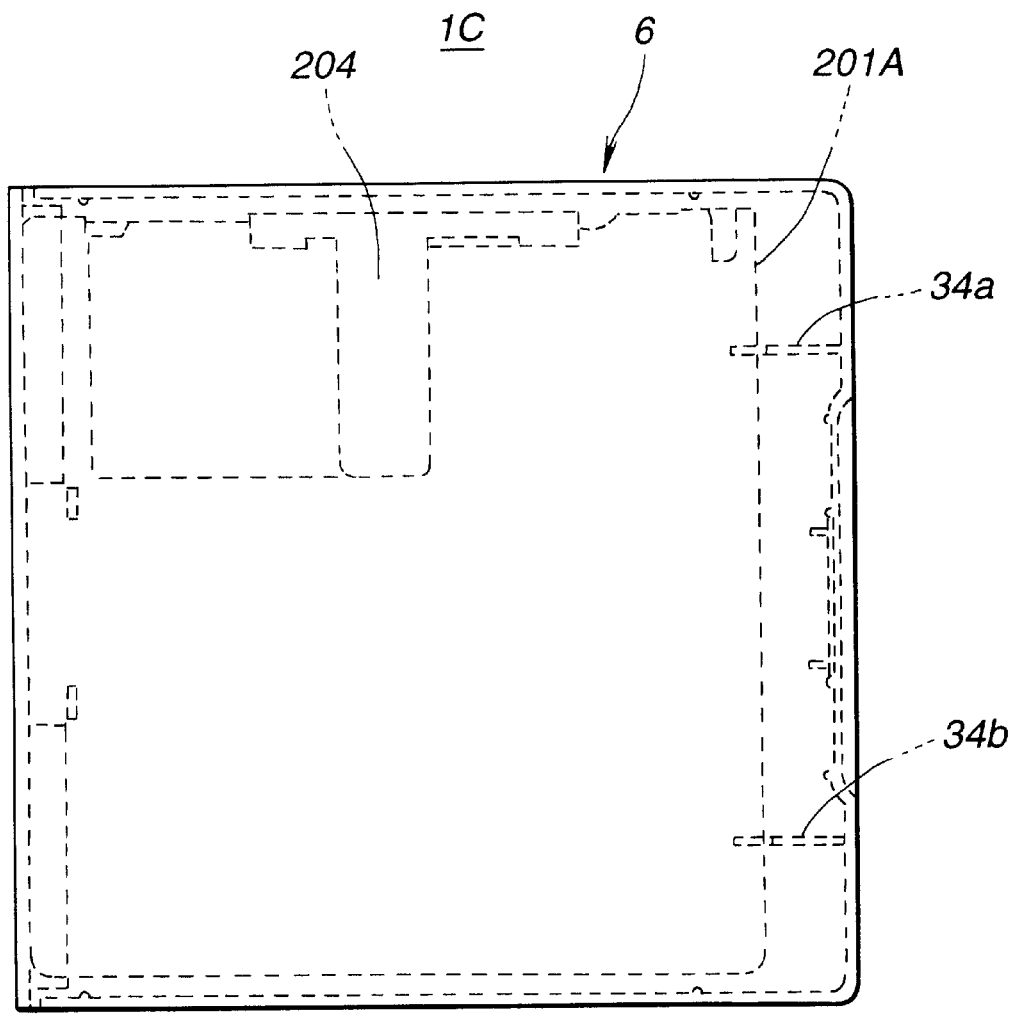
FIG. 22 is a plan view of the cartridge holder of the third embodiment in a closed condition, with a cartridge properly held in the holder, that is illustrated by a broken line.

As is seen from FIG. 21, in a closed condition of the cartridge holder 1C, the distance "L1" between the bottom surface of each cartridge gripping part 2a, 2b or 2c and the stopper edge 34a', 34b', 35a' or 35b' of the retaining rib 34a, 34b, 35a or 35b is somewhat greater than the width "L2" of the cartridge 201A, 201B or 201C, but smaller than the length "L3" (see FIG. 13) of the same. Furthermore, the height "H1" of the cartridge gripping part 2a, 2b or 2c (that is, the distance between the depth of the groove and the top of the side wall) is greater than the maximum clearance "ϵ1" which is defined between the outside side edge of the cartridge 201A, 201B or 201C and the stopper edge 34a', 34b', 35a' or 35b' of the retaining rib 34a, 34b, 35a or 35b. Furthermore, when the holder 1C assumes the closed condition, the clearance "ϵ2" between the inwardly leading end of the retaining rib 34a or 34b of the lid portion 6 and that of the retaining rib 35a or 35b of the lid portion 7 is greater than the thickness "T" of the cartridge 201A, 201B or 201C.

As is seen from FIG. 21, each retaining rib 34a, 34b, 35a or 35b is formed with a seating rib 36 which functions to support the outside side edge of the cartridge 201A or 201C. The arrangement of the seating ribs 36 may be easily understood from FIG. 7. As is seen from FIG. 21, the thickness of each seating rib 36 is greater than the thickness of a label card 301 which may be put in the cartridge receiving recess of the lid portion 7. Furthermore, the distance "H2" between the outer surface of the lid portion 7 or 6 and the top of the seating rib 36 is equal to the distance "H3" between the outer surface of the lid portion 7 or 6 and the inner surface of the outside wall of the cartridge gripping part 2c or 2a. Stoppers 37 and 37 are formed on the cartridge receiving recess of the lid portion 7 near the cartridge gripping part 2c to suppress movement of the label card 301 toward the hinge portion 5.

In this embodiment 1C, the label card 301 must be put into the cartridge receiving recess of the lid portion 7 before the three cartridges 201A, 201B and 201C are put into the cartridge gripping parts 2a, 2b and 2c.

Figure 23:
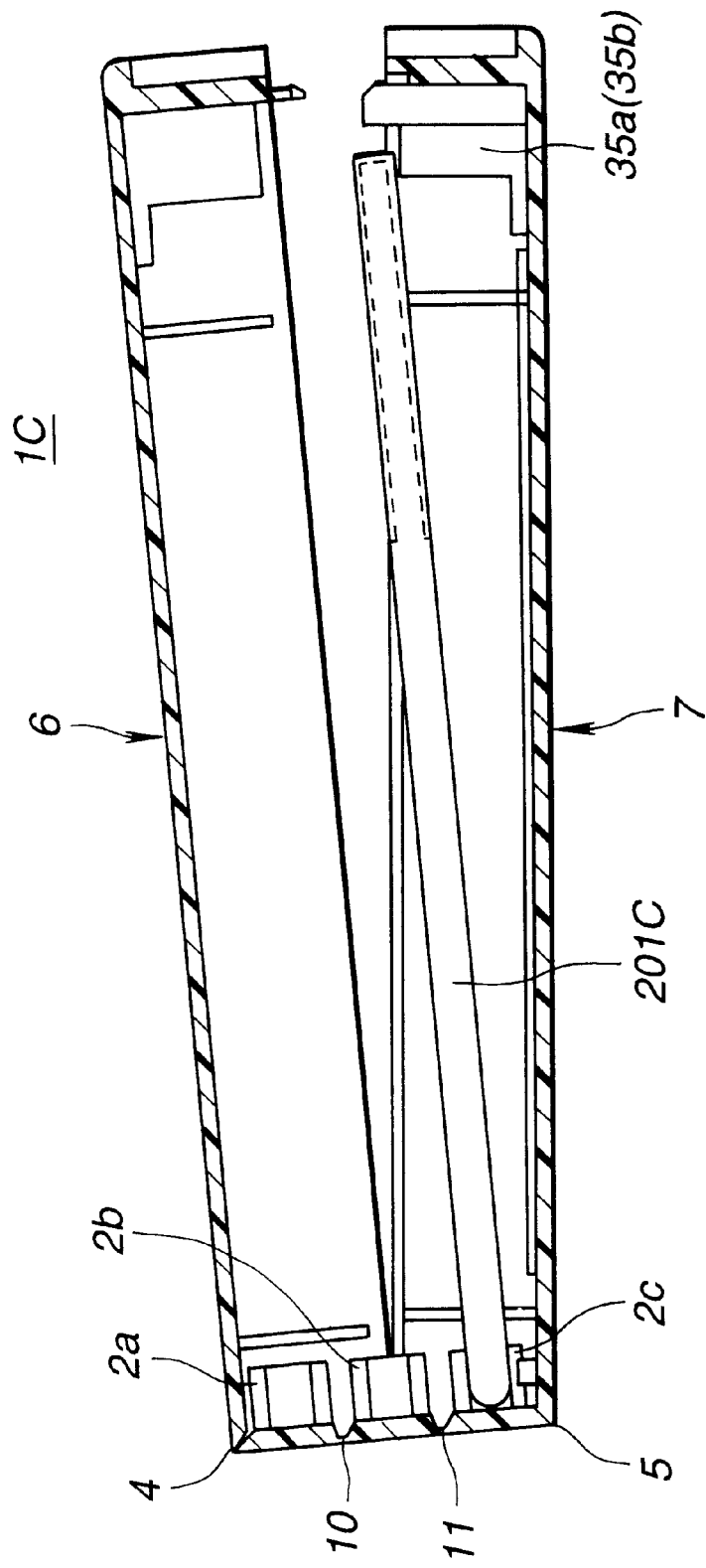
FIG. 23 is an enlarged sectional view of the cartridge holder of the third embodiment, with a cartridge held therein in an erroneous manner.

If now, as is seen from FIG. 23, the cartridge 201C has been erroneously thrust in the cartridge gripping part 2c, that is, when a shutter-mounted side of the cartridge 201C has been gripped by the part 2c, closing of the lid portions 6 and 7 is not properly made. That is, in such erroneous case, the cartridge 201C can not be neatly put into the cartridge receiving recess of the lid portion 7 because the outside end thereof is obstructed by the cartridge retaining ribs 35a and 35b as shown. Of course, in this case, the user will notice the erroneous insertion.

Due to provision of the improved cartridge retaining ribs 34a, 34b, 35a and 35b, the cartridges 201A, 201B and 201C are assuredly held in the holder 1C. That is, even when the holder 1C is applied with a shock, the cartridges can be held in the holder 1C without being disengaged from the gripping parts 2a, 2b and 2c. Furthermore, if the cartridges are erroneously thrust into the gripping parts 2a, 2b and 2c, the user can notice such erroneous insertion instantly.

Referring to FIGS. 24 to 28, there is shown a cartridge holder 1D of a fourth embodiment of the present invention.

Since the cartridge holder 1D of this embodiment is similar in construction to that 1A of the first embodiment, only parts and construction which are different from those of the first embodiment 1A will be described in the following.

Figure 27:
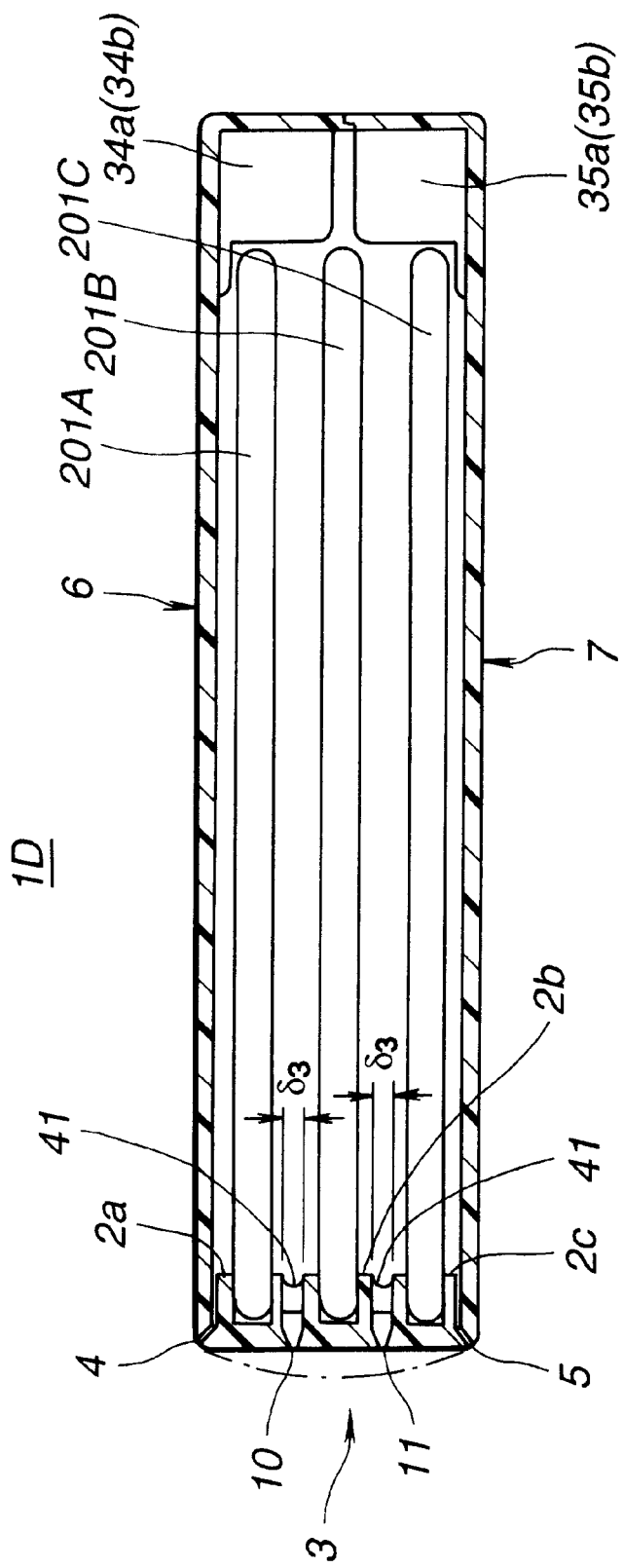
FIG. 27 is a sectional view of the cartridge holder of the fourth embodiment in a closed and locked condition.
Figure 28:
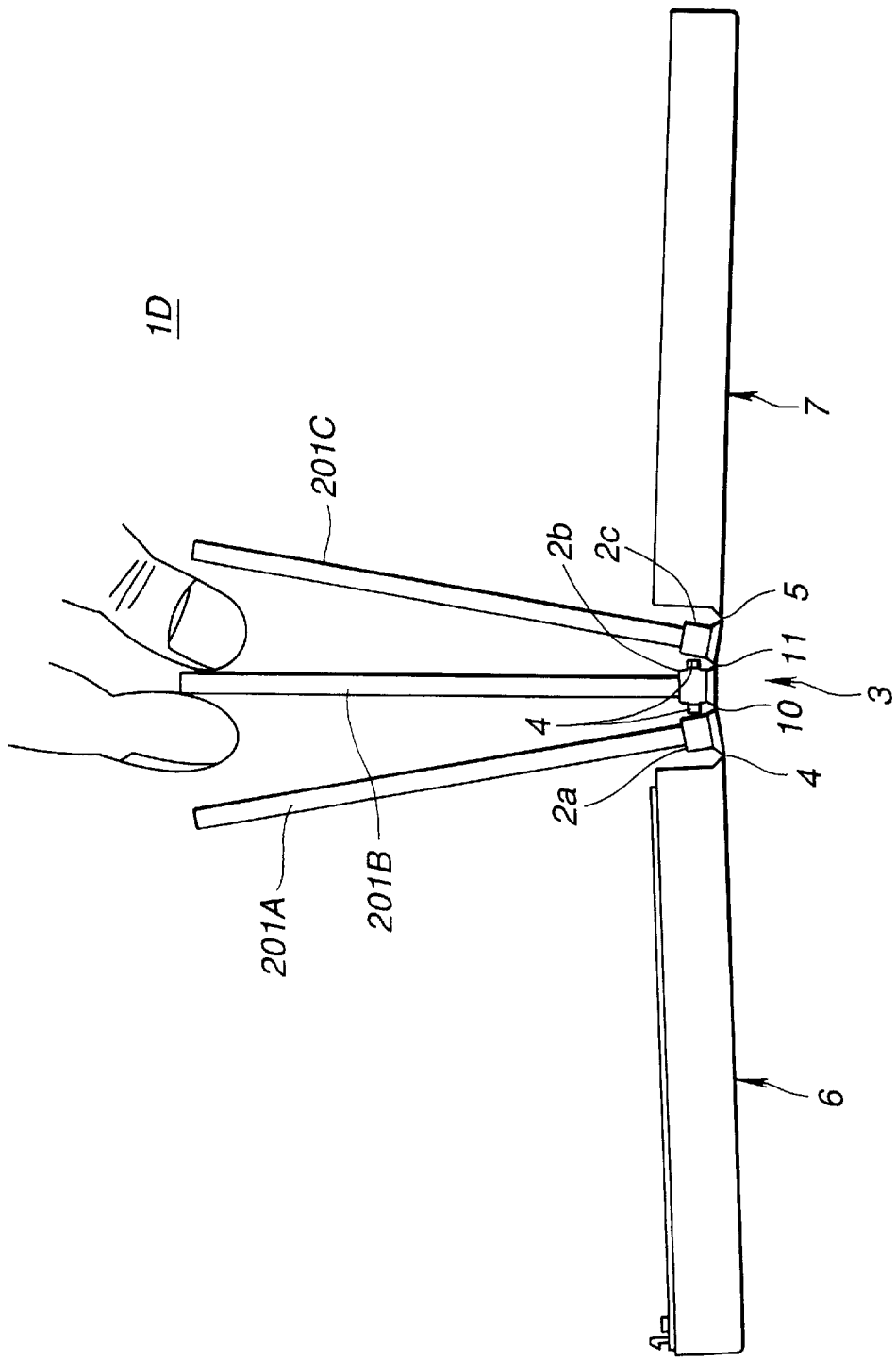
FIG. 28 is a view similar to FIG. 15, but showing an advantage given to the cartridge holder of the fourth embodiment.

That is, in this fourth embodiment 1D, there is further employed a so-called "swell-out suppressing means" 41 which, as is seen from FIG. 27, suppresses undesired swell-out movement of the back portion 3, as depicted by a phantom line, which tends to occur when the lid portions 6 and 7 are put on each other to close the cartridge holder 1D.

Figure 24:
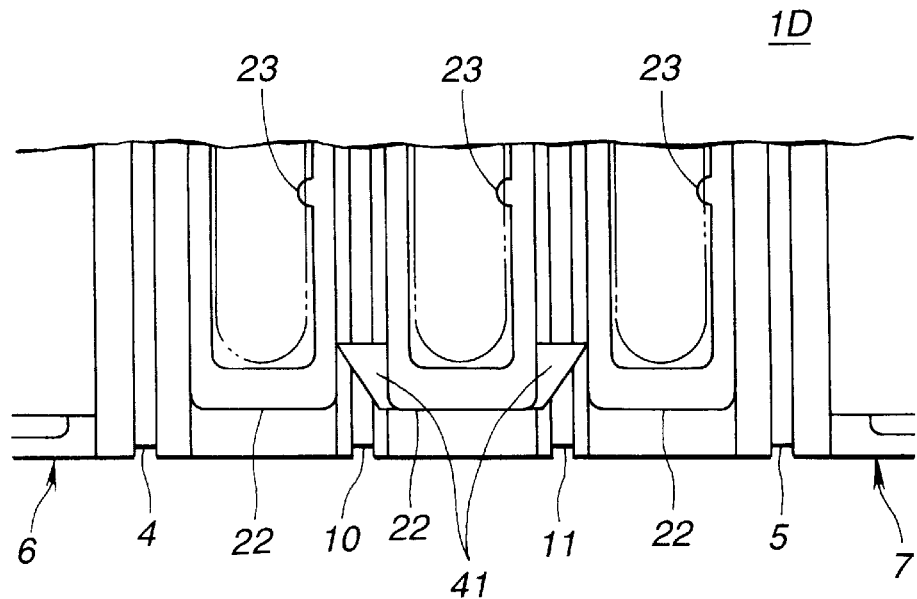
FIG. 24 is a sectional view similar to FIG. 5, but showing a cartridge holder of a fourth embodiment of the present invention.
Figure 25:
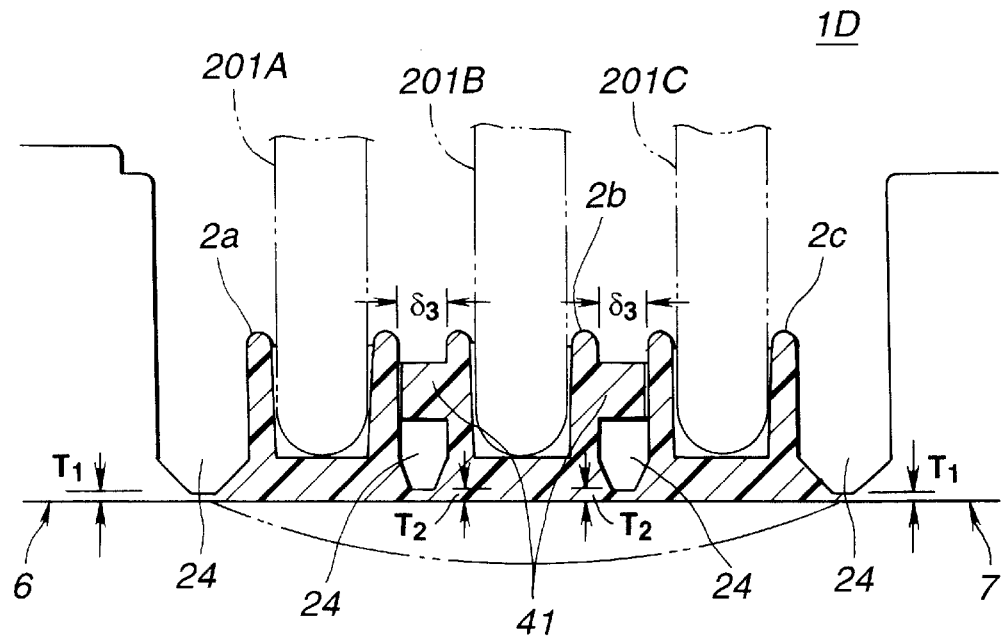
FIG. 25 is a sectional view similar to FIG. 6, but showing the cartridge holder of the fourth embodiment.
Figure 26:
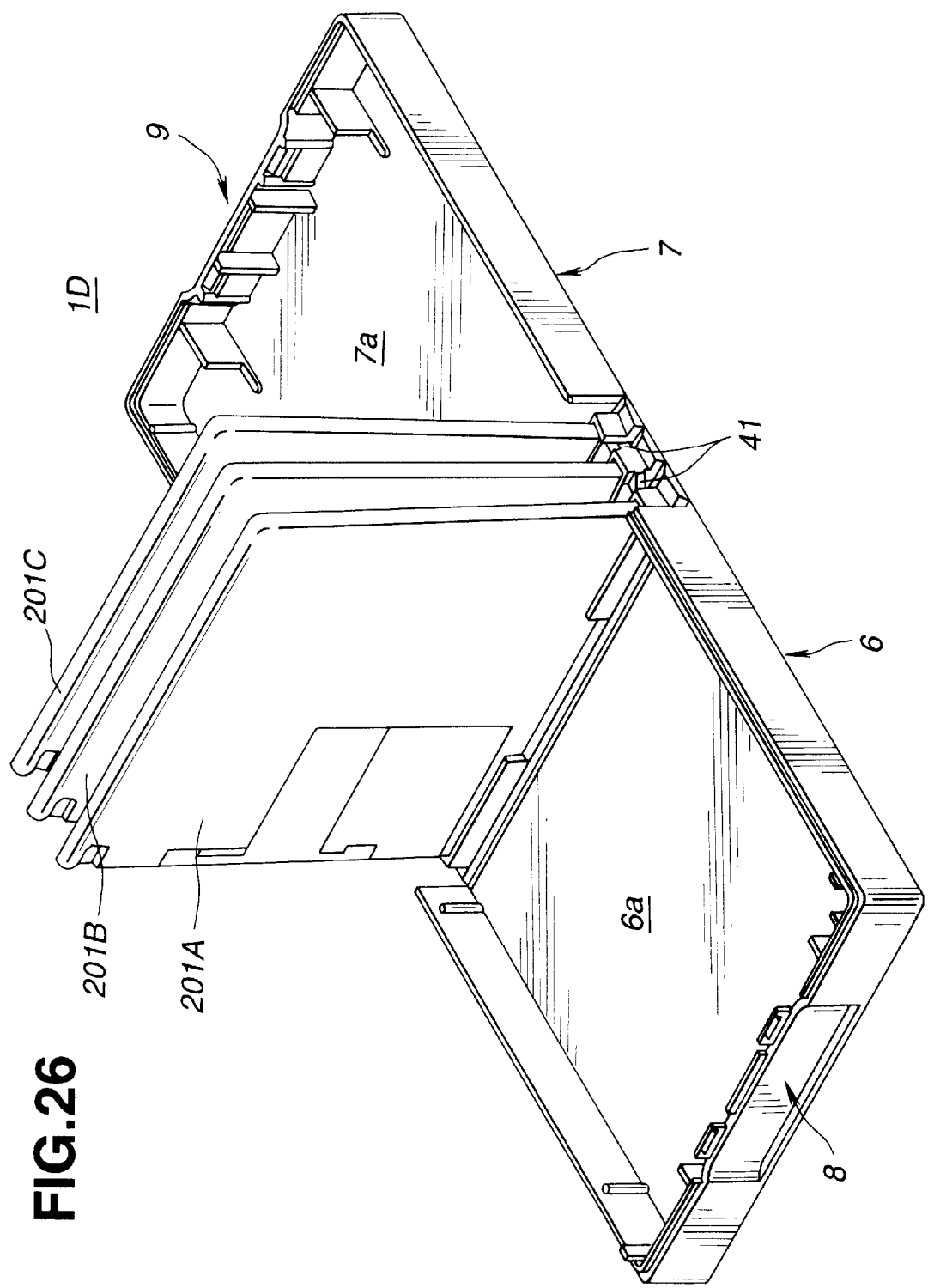
FIG. 26 is a plan view of the cartridge holder of the fourth embodiment.

As is well shown in FIGS. 24 and 25, the swell-out suppressing means 41 comprises two triangular projections 41 and 41 which are integrally formed on outer surfaces of the parallel walls of the second, or center, cartridge gripping part 2b. As shown, the triangular projections 41 and 41 project toward the inside ones of the parallel walls of the first and third cartridge gripping parts 2a and 2c. The size "ϵ3" of each projection 41 is so determined that when the cartridge holder 1D assumes the open position as shown in FIG. 25, the tip of the projection 41 is slightly separated from the inside wall of the corresponding gripping part 2a or 2c.

When, as is seen from FIG. 27, when the lid portions 6 and 7 are pivoted about the hinge portions 4 and 5 and put on each other to close the holder 1D, the tips of the projections 41 of the center cartridge gripping part 2b are bought into abutment with the inside walls of the gripping parts 2a and 2c keeping both a clearance between the first and second cartridge gripping parts 2a and 2b and a clearance between the second and third cartridge gripping parts 2b and 2c. Due to the clearances thus kept, the back portion 3 of the holder 1D is prevented from making the unsightly well-out movement. As is seen from FIG. 28, once the holder 1D is opened, the three cartridges 201A, 201B and 201C can be easily removed from the gripping portions 2a, 2b and 2c for the reason which has been mentioned in the section of the first embodiment 1A.

Referring to FIGS. 29 to 35, there is shown a cartridge holder 1E of a fifth embodiment of the present invention.

The cartridge holder 1E of this embodiment is substantially the same as the cartridge holder 1D of the above-mentioned fourth embodiment except for the construction of the swell-out suppressing means 41.

Figure 29:
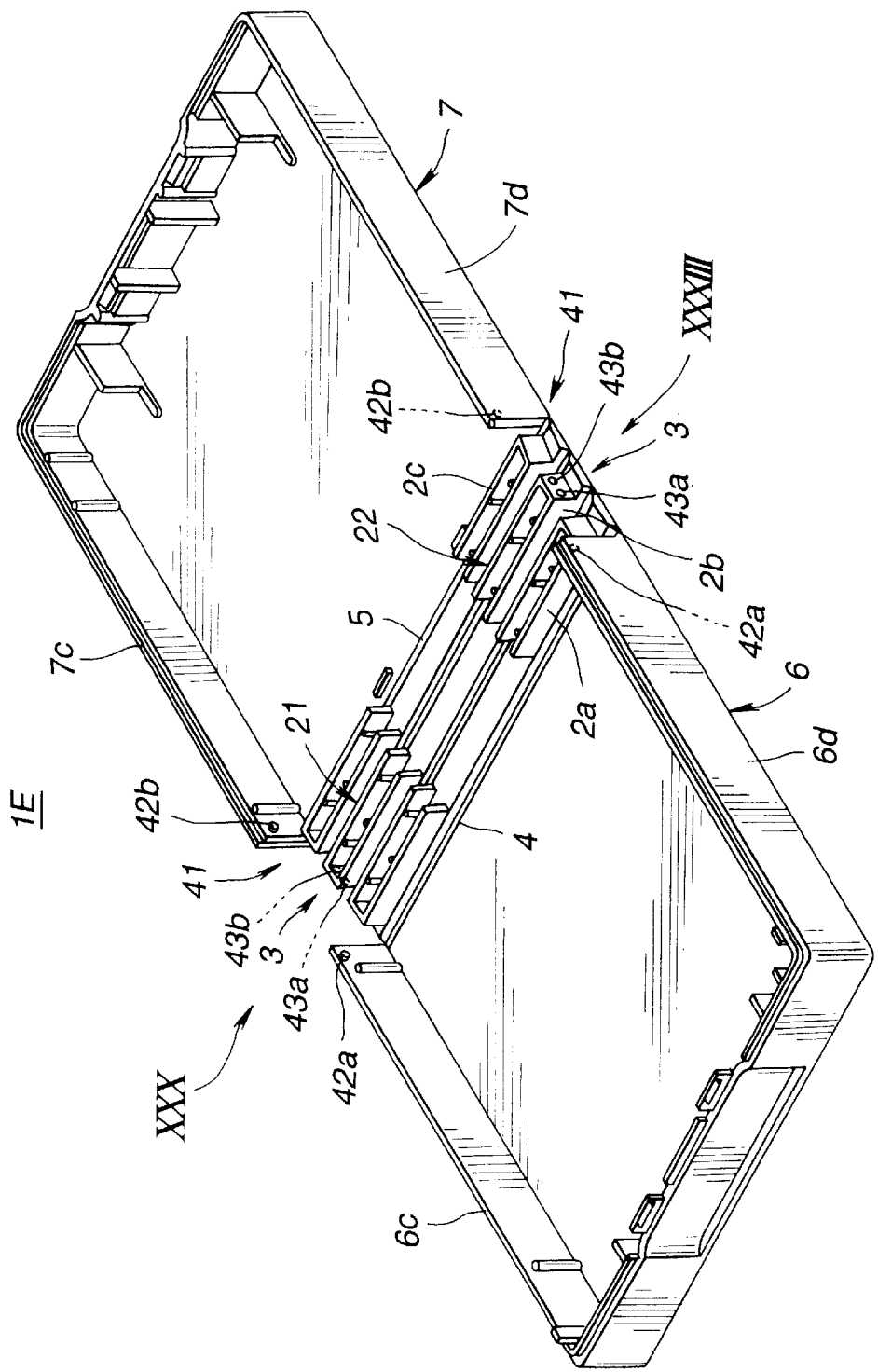
FIG. 29 is a perspective view of a cartridge holder of a fifth embodiment of the present invention.

That is, in this fifth embodiment 1E, as is seen from FIG. 29, the swell-out suppressing means 41 comprises two small projections 42a or 42b which are formed on inner surfaces of the side walls 6c and 6d (or, 7c and 7d) of the lid portion 6 or 7 near the hinge portion 4 or 5, and two small recesses 43a or 43b which are formed on an outer surface of the connecting wall of each U-shaped projection 21 or 22 of the center cartridge gripping part 2b. Preferably, the small projections 42a and 42b are shaped to have spherical tops and the small recesses 43a and 43b are shaped to have spherical bottoms.

Figure 30:
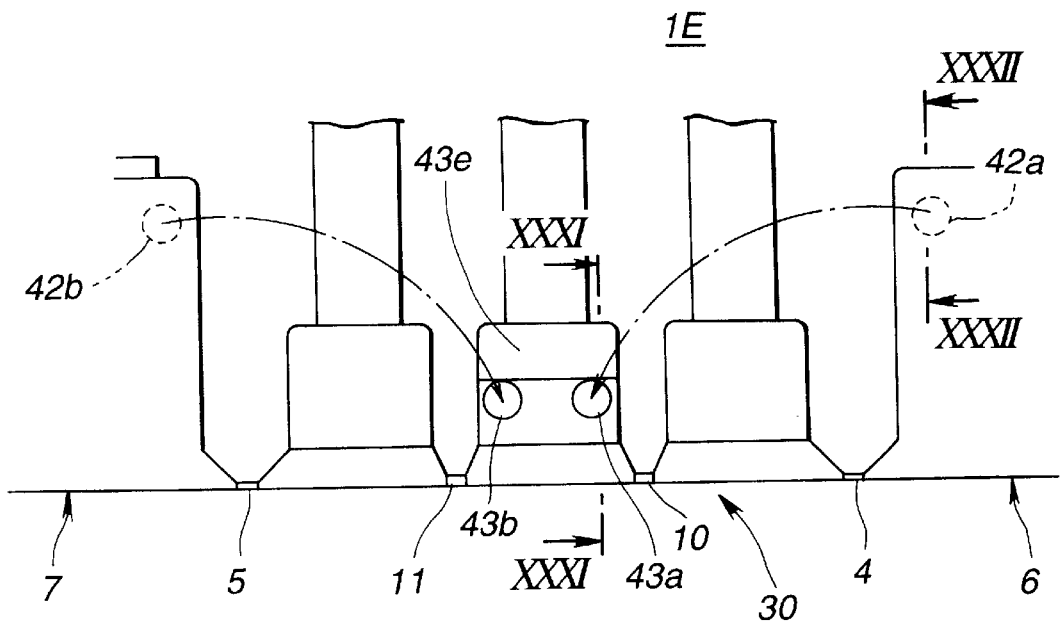
FIG. 30 is an enlarged view of the portion indicated by an arrow "XXX" of FIG. 29.
Figure 31:
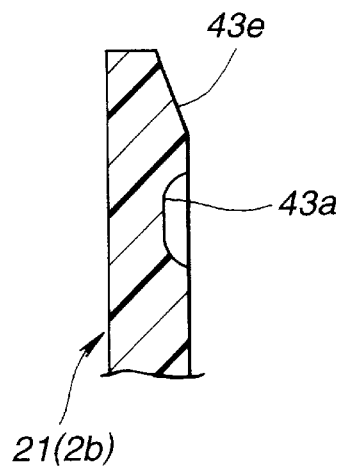
FIG. 31 is a sectional view taken along the line "XXXI—XXXI" of FIG. 30.
Figure 32:
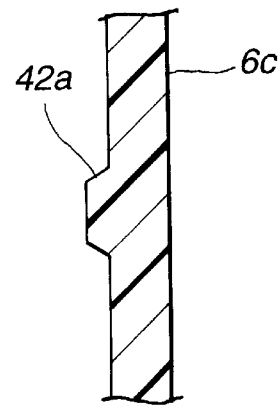
FIG. 32 is a sectional view taken along the line "XXXII—XXXII" of FIG. 30.
Figure 33:
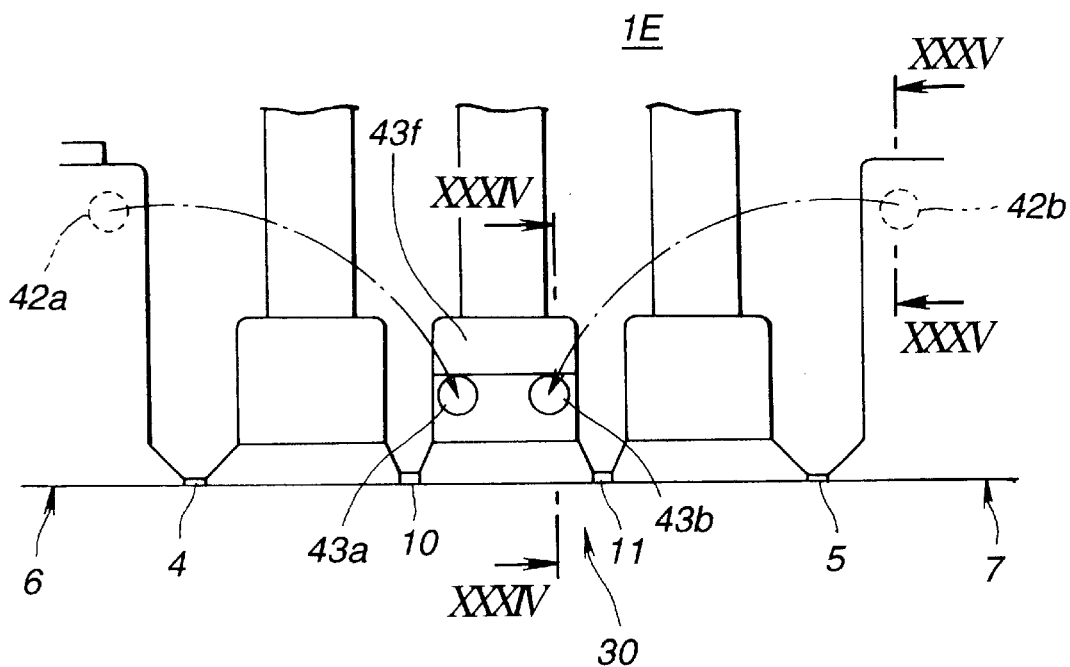
FIG. 33 is an enlarged view of the portion indicated by an arrow "XXXIII" of FIG. 29.
Figure 34:
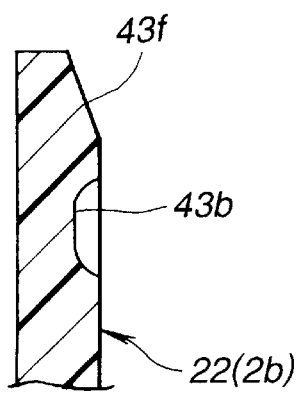
FIG. 34 is a sectional view taken along the line "XXXIV—XXXIV" of FIG. 33.
Figure 35:
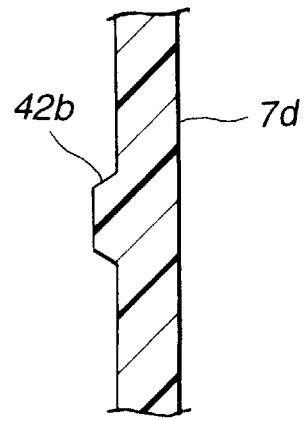
FIG. 35 is a sectional view taken along the line "XXXV—XXXV" of FIG. 33.
Figure 36:
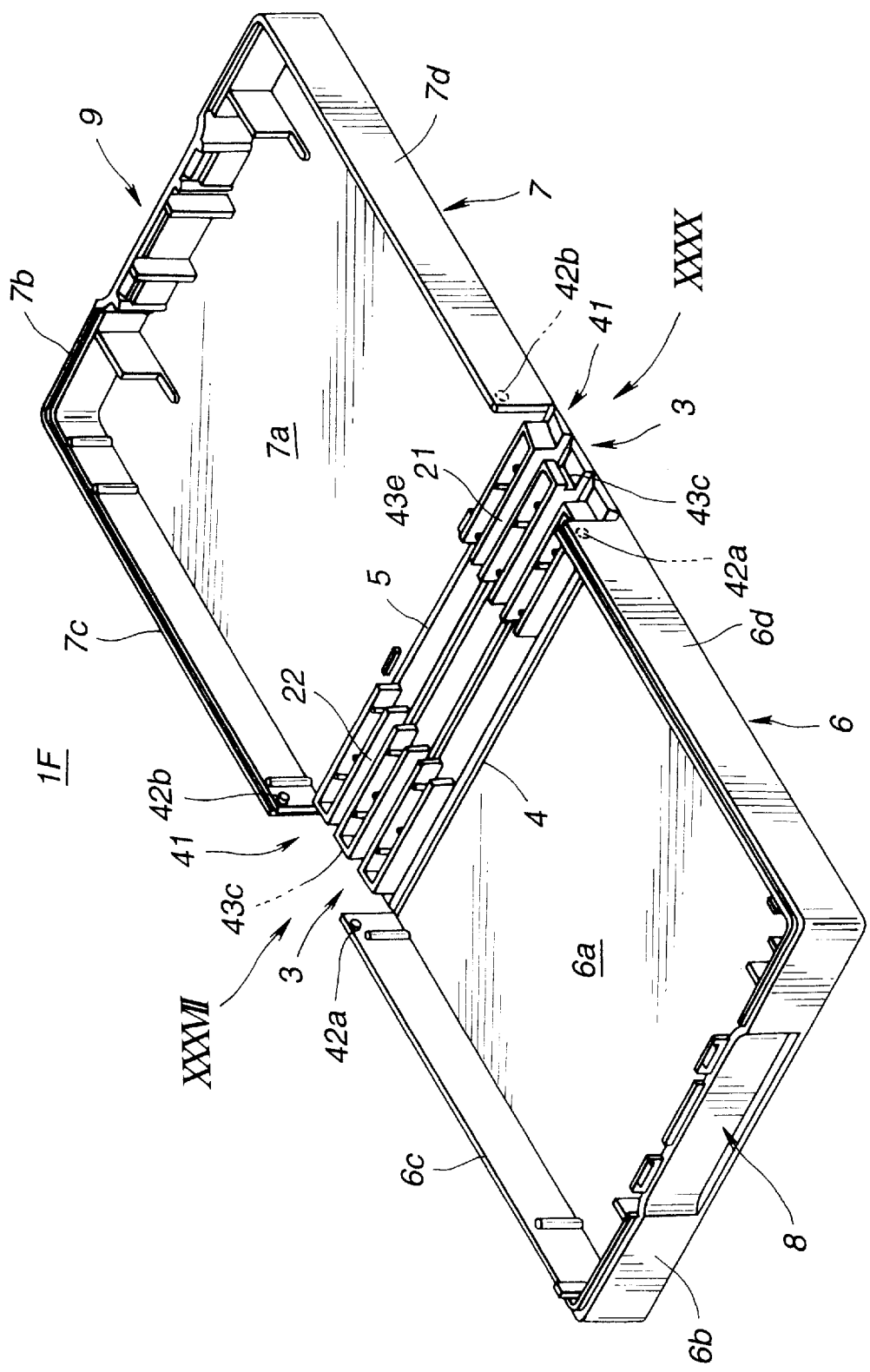
FIG. 36 is a perspective view of a cartridge holder of a sixth embodiment of the present invention.

When, as is seen from FIGS. 30 and 33, the lid portions 6 and 7 are pivoted about the hinge portions 4 and 5 and put on each other to close the holder 1E, the projections 42a of the lid portion 6 are brought into engagement with the recesses 43a of the center cartridge gripping portion 2b and at the same time the projections 42b of the other lid portion 7 are brought into engagement with the recesses 43b of the center cartridge gripping portion 2b. With this, the undesired swell-out phenomenon of the back portions 3 is suppressed.

As is seen from FIGS. 30, 31, 33 and 34, the connecting walls of the aligned U-shaped projections 21 and 22 of the center cartridge gripping part 2b are formed with inclined upper surfaces 43e and 43f for smoothing movement of the projections 42a and 42b toward the recesses 43a and 43b.

Referring to FIGS. 36 to 42, there is shown a cartridge holder 1F of a sixth embodiment of the present invention.

The cartridge holder 1F of this embodiment is substantially the same as the cartridge holder 1E of the above-mentioned fifth embodiment except for the construction of the swell-out suppressing means 41.

That is, in this sixth embodiment 1F, in place of the small recesses 43a and 43b employed in the fifth embodiment 1E, grooves 43c and 43c are provided in the connecting walls of the aligned projections 21 and 22 of the center cartridge gripping part 2b. Similar to the fifth embodiment 1E, projections 42a and 42b are provided by the lid portions 6 and 7 and the inclined upper surfaces 43e and 43f are provided by the connecting walls.

Figure 37:
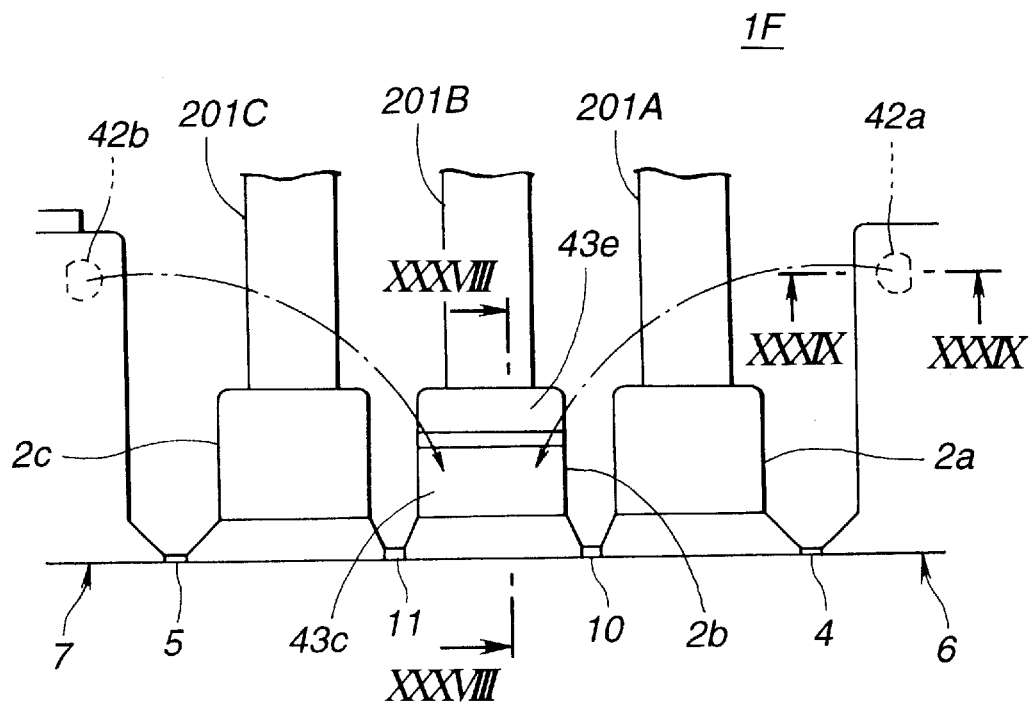
FIG. 37 is an enlarged view of the portion indicated by an arrow "XXXVII" of FIG. 36.
Figure 38:
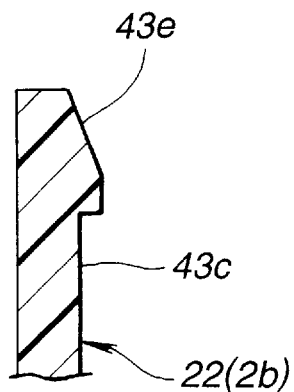
FIG. 38 is a sectional view taken along the line "XXXVIII—XXXVIII" of FIG. 37.
Figure 39:
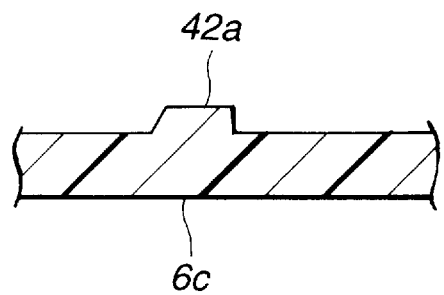
FIG. 39 is a sectional view taken along the line "XXXIX—XXXIX" of FIG. 37.
Figure 40:
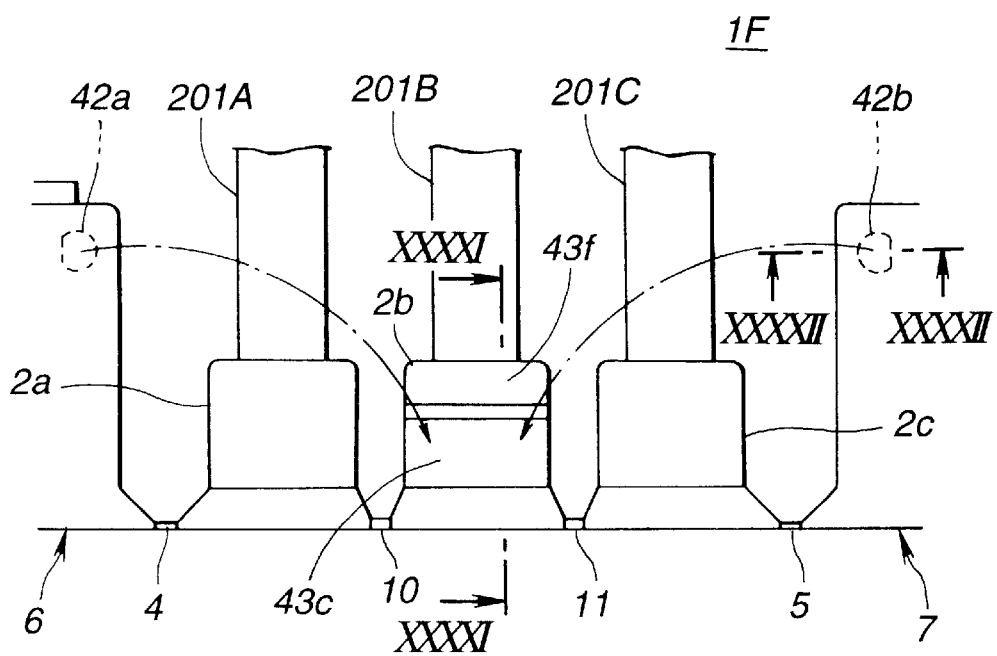
FIG. 40 is an enlarged view of the portion indicated by an arrow "XXXX" of FIG. 36.
Figure 41:
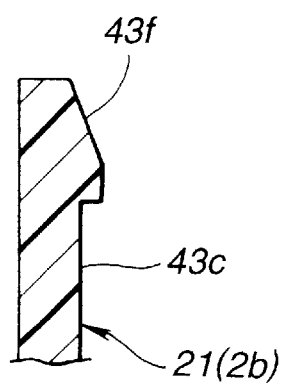
FIG. 41 is a sectional view taken along the line "XXXXI—XXXXI" of FIG. 40.
Figure 42:
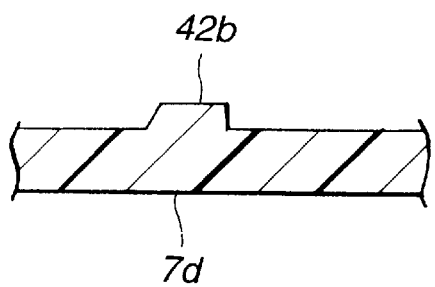
FIG. 42 is a sectional view taken along the line "XXXXII—XXXXII" of FIG. 40.

When, as is seen from FIGS. 37 and 40, the lid portions 6 and 7 are pivoted about the hinge portions 4 and 5 and put on each other to close the holder 1F, the projections 42a and 42b are brought into engagement with the respective grooves 43c to suppress the undesired swell-out phenomenon of the back portions 3.

Referring to FIGS. 43 to 51, there is shown a cartridge holder 1G of a seventh embodiment of the present invention.

The cartridge holder 1G of this embodiment is substantially the same as the cartridge 1E of the above-mentioned fifth embodiment except for the construction of the swell-out suppressing means 41.

That is, in this seventh embodiment 1G, the swell-out suppressing means 41 comprises two edge like projections 42f or 42g which are formed on inside ends of the side walls 6c and 6d (or 7c and 7d) of the lid portions 6 or 7, and grooved structures 43g and 43h which are formed on laterally opposed ends of the back portions 3.

As is seen from FIGS. 44, 45, 48 and 49, the edge like projections 42f and 42g have each a dove-tail cross section.

Figure 43:
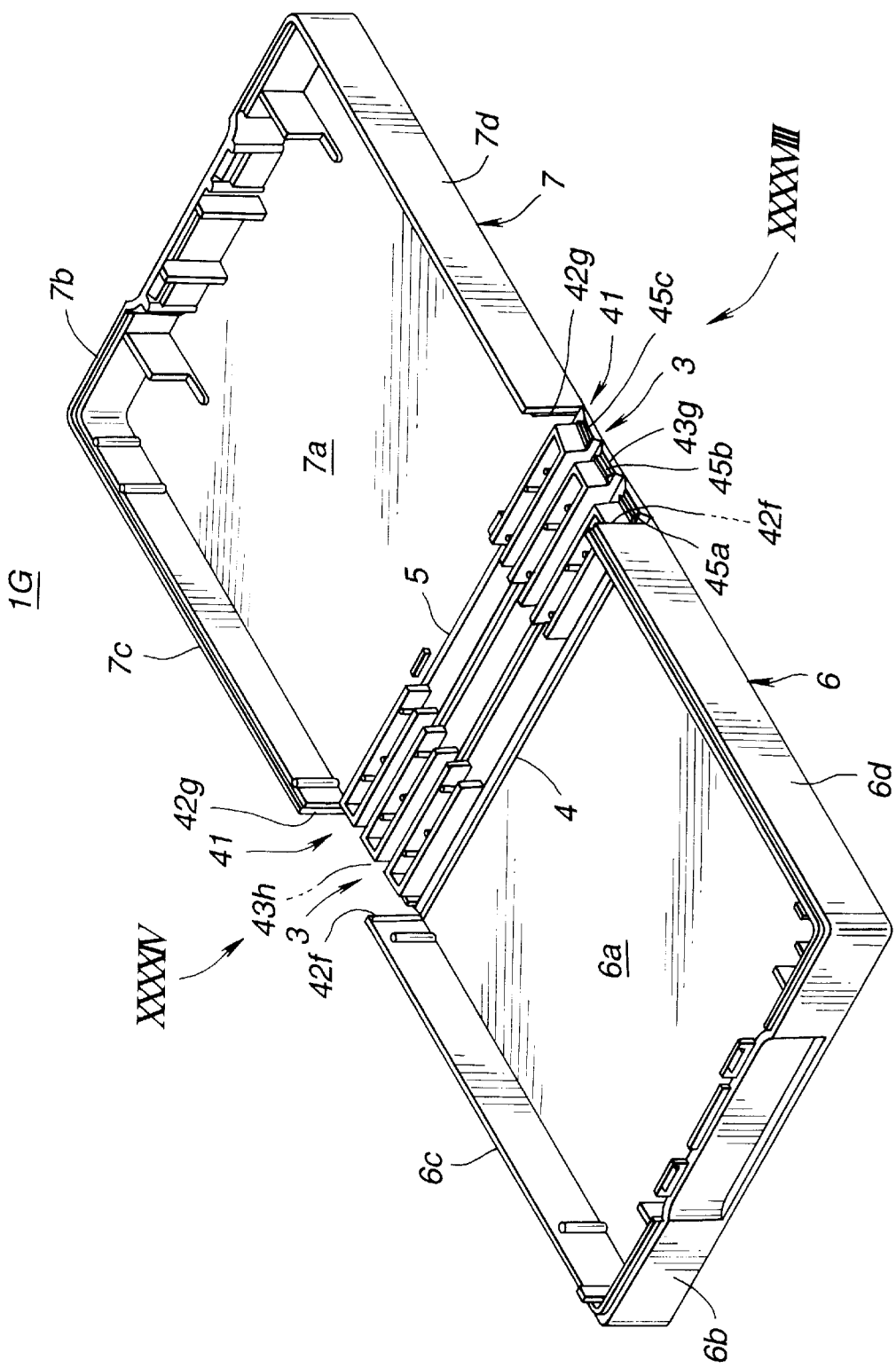
FIG. 43 is a perspective view of a cartridge holder of a seventh embodiment of the present invention.

As is seen from FIG. 43, each of the grooved structures 43g and 43h comprises three aligned grooves 45a, 45b and 45c which are provided by respective longitudinal ends of the first, second and third cartridge gripping parts 2a, 2b and 2c. As is seen from FIGS 44, 46, 47, 48, 50 and 51, each of the aligned grooves 45a, 45b and 45c has a dove-tail cross section.

Figure 44:
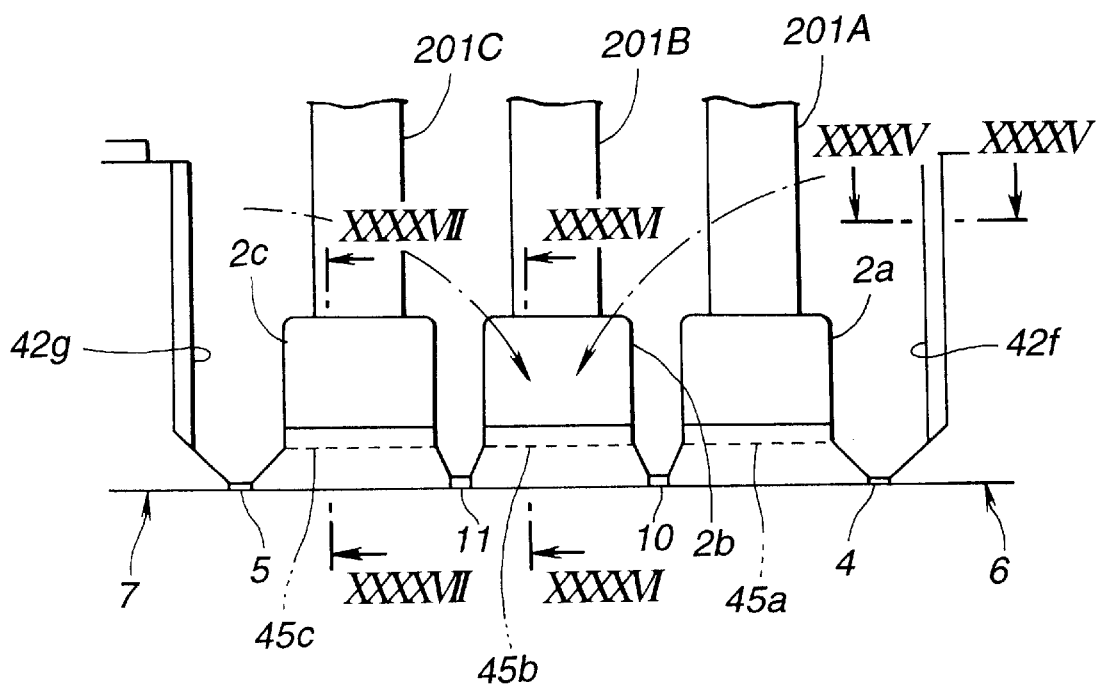
FIG. 44 is an enlarged view of the portion indicated by an arrow "XXXXIV" of FIG. 43.
Figure 45:
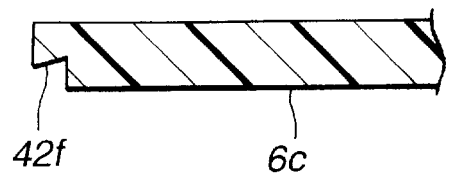
FIG. 45 is a sectional view taken along the line "XXXXV—XXXXV" of FIG. 44.
Figure 46:
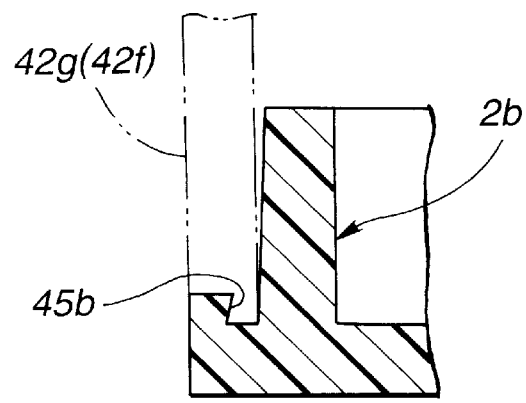
FIG. 46 is a sectional view taken along the line "XXXXVI—XXXXVI" of FIG. 44.
Figure 47:
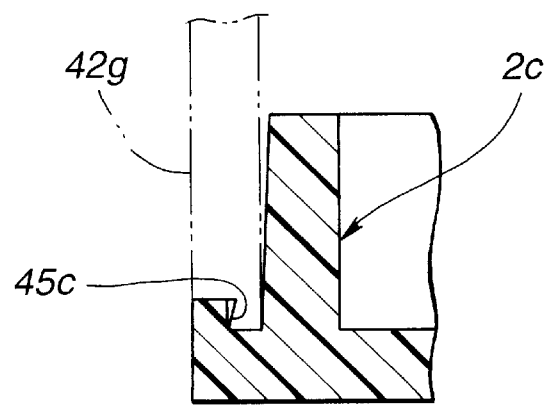
FIG. 47 is a sectional view taken along the line "XXXXVII—XXXXVII" of FIG. 44.
Figure 48:
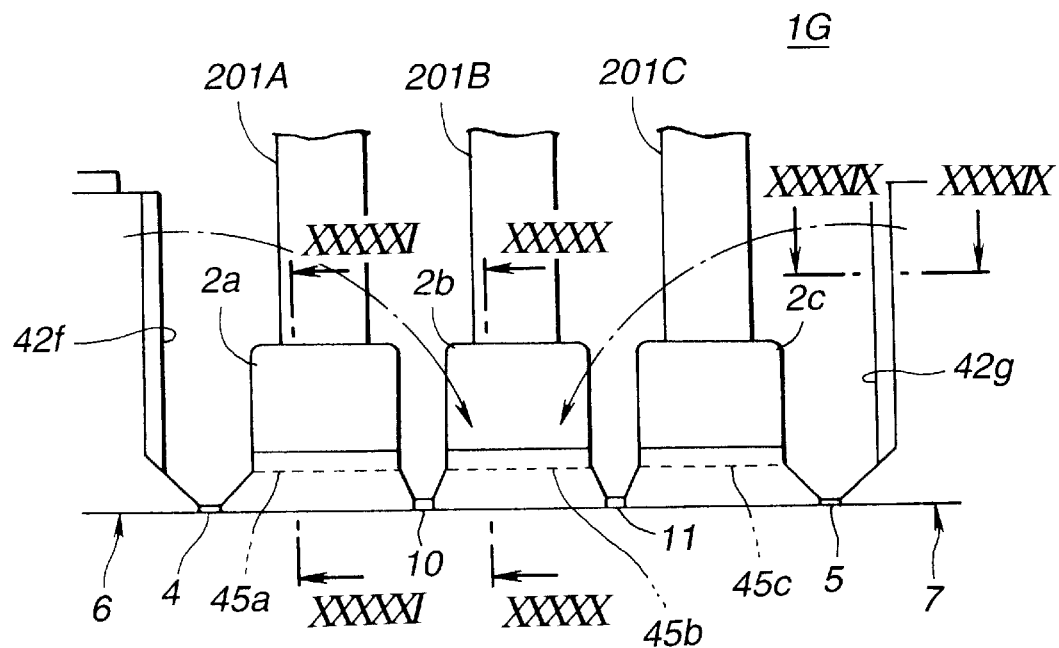
FIG. 48 is an enlarged view of the portion indicated by an arrow "XXXXVIII" of FIG. 43.
Figure 49:
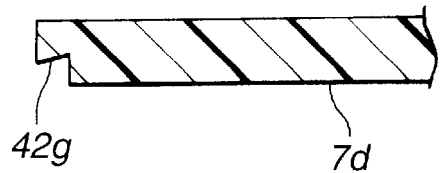
FIG. 49 is a sectional view taken along the line "XXXXIX—XXXXIX" of FIG. 48.
Figure 50:
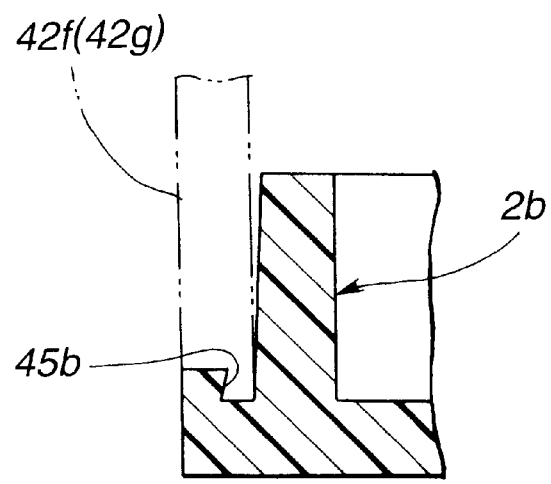
FIG. 50 is a sectional view taken along the line "XXXXX—XXXXX" of FIG. 48.
Figure 51:
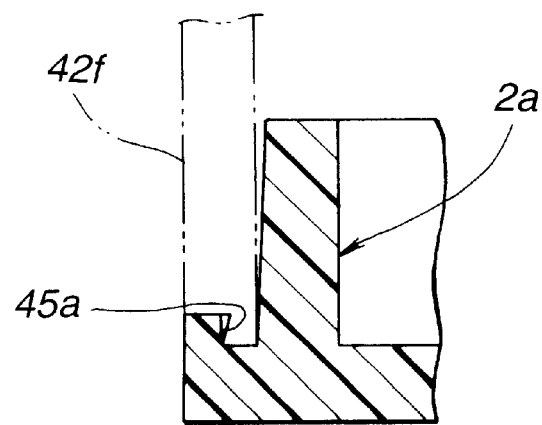
FIG. 51 is a sectional view taken along the line "XXXXXI—XXXXXI" of FIG. 48.
Figure 52:
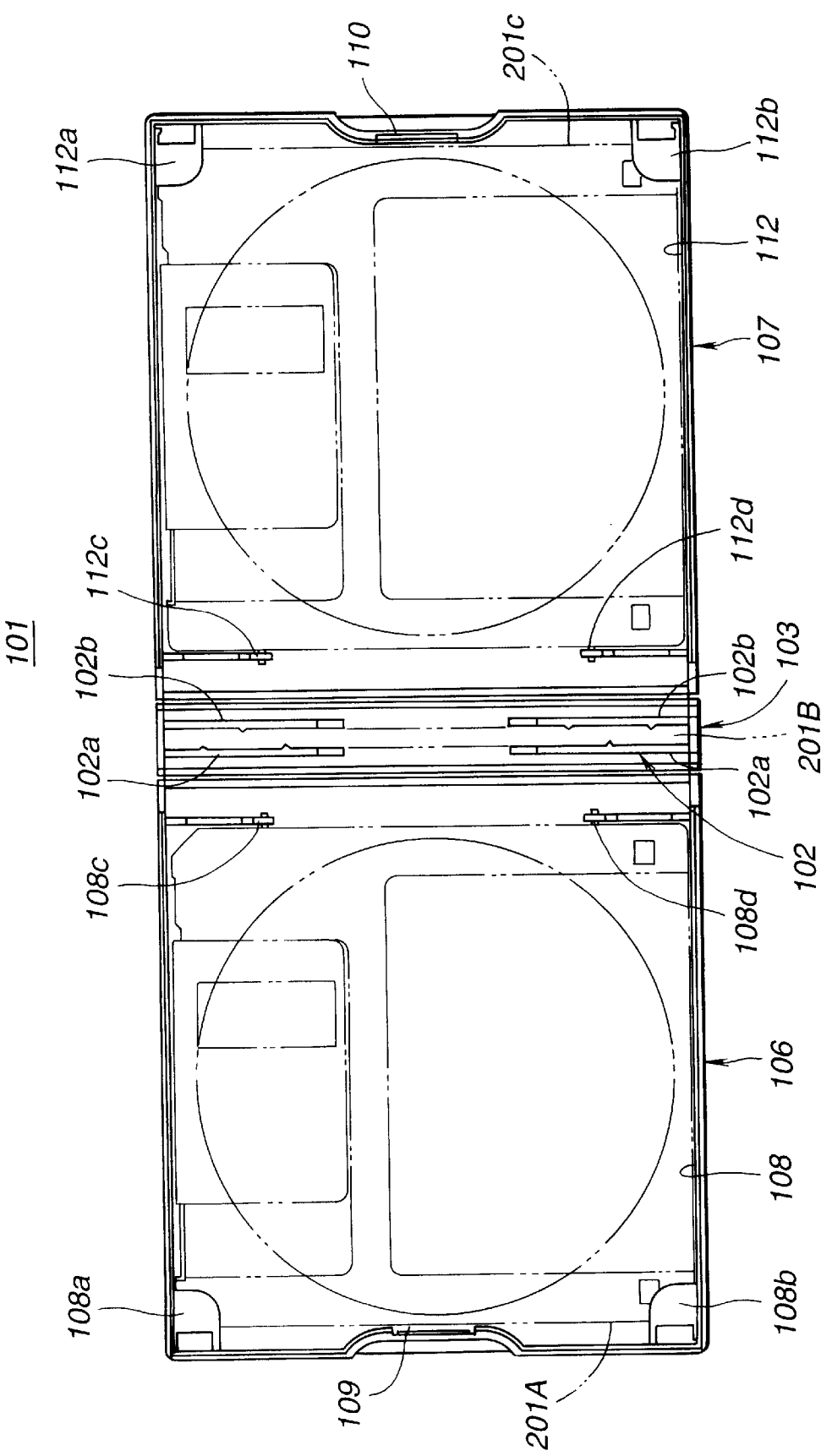
FIG. 52 is a plan view of a conventional cartridge holder.
Figure 53:
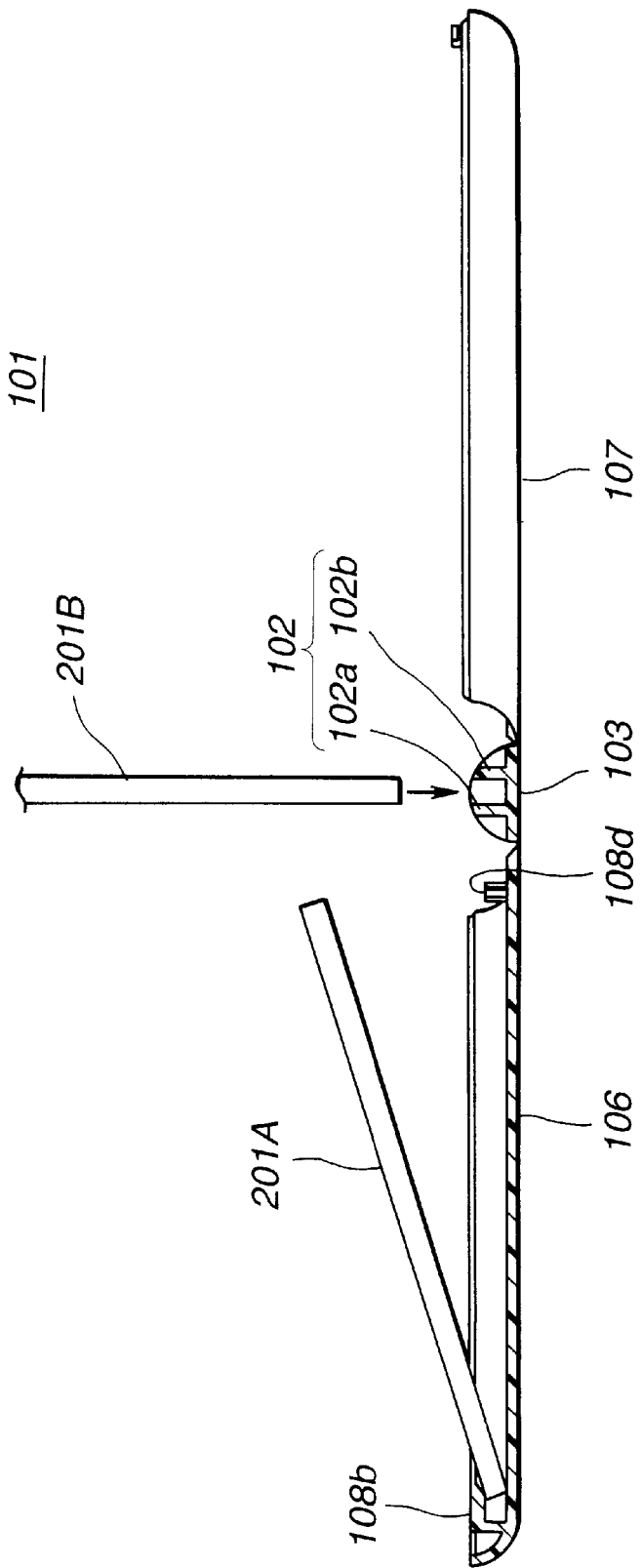
FIG. 53 is a front view of the conventional cartridge holder with cartridges being about to be held by the holder.
Figure 54:
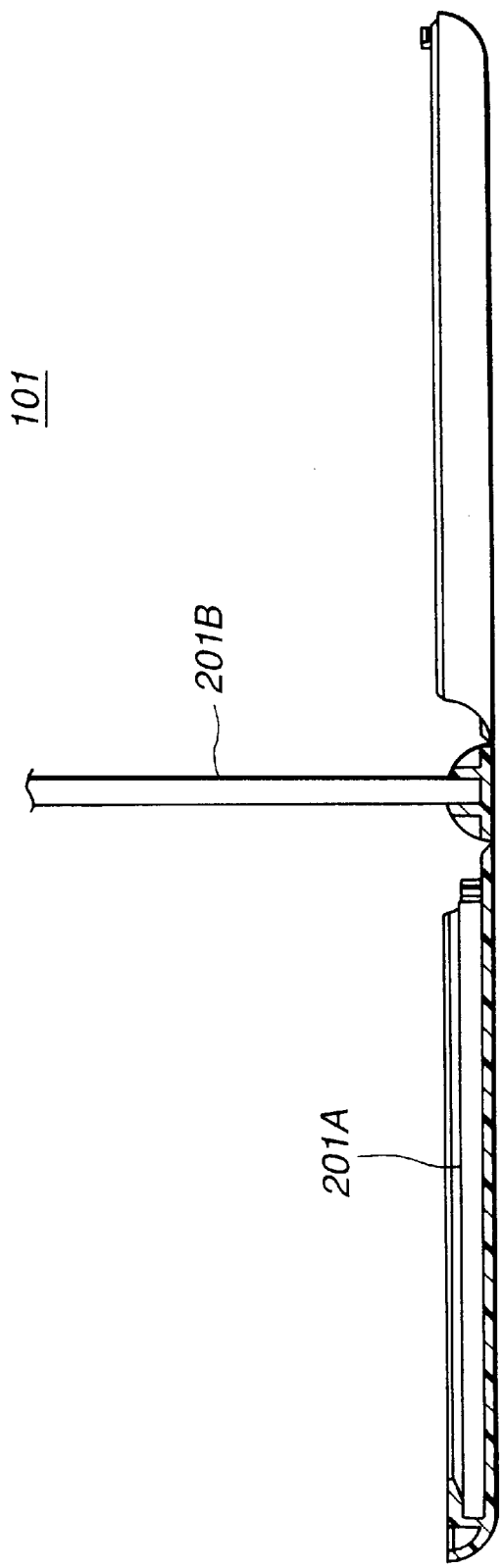
FIG. 54 is a view similar to FIG. 53, but showing the cartridges kept tightly held by the holder.
Figure 55:
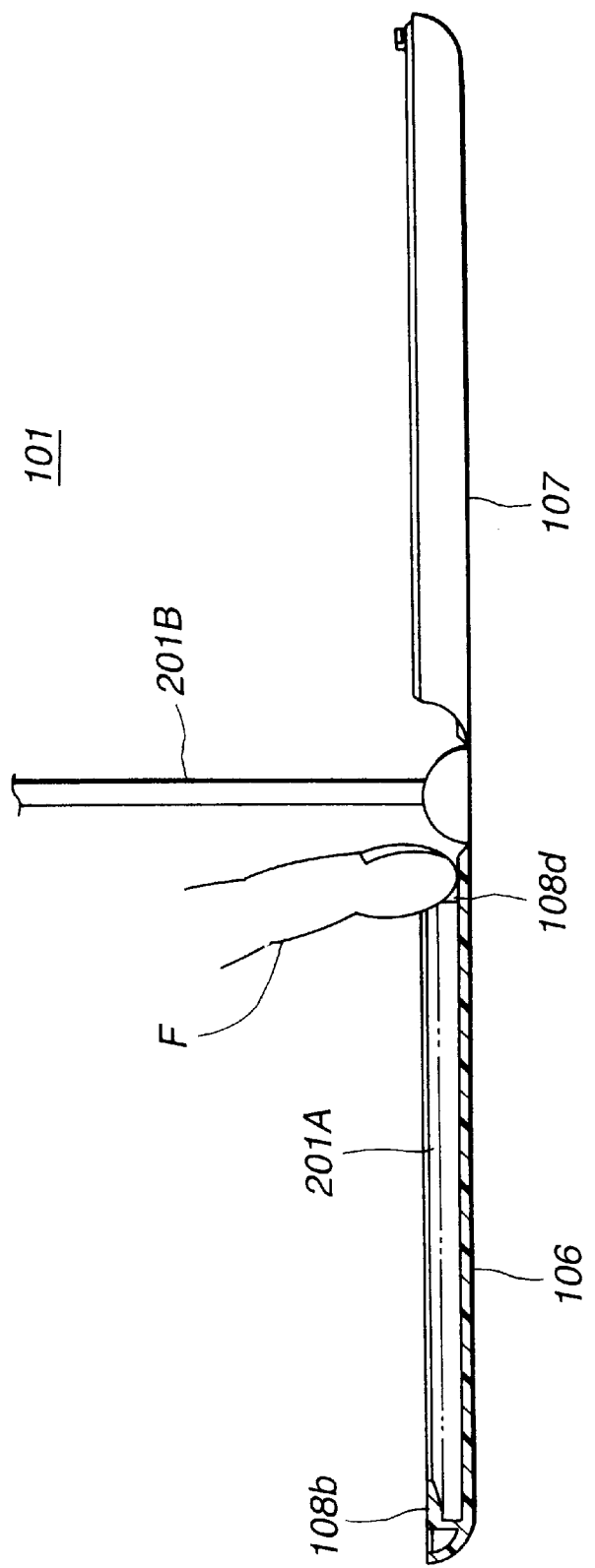
FIG. 55 is a view similar to FIG. 54, but depicting a disadvantage possessed by the conventional cartridge holder.
Figure 56:
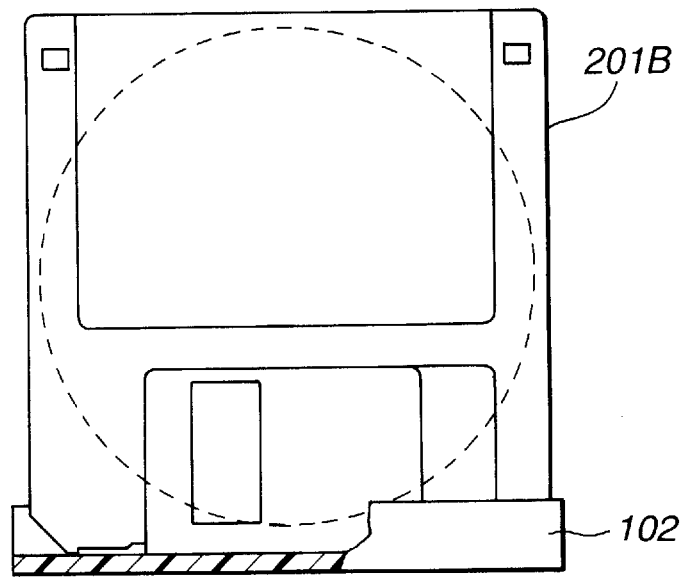
FIG. 56 is a view depicting another disadvantage possessed by the conventional cartridge holder.
Figure 57:
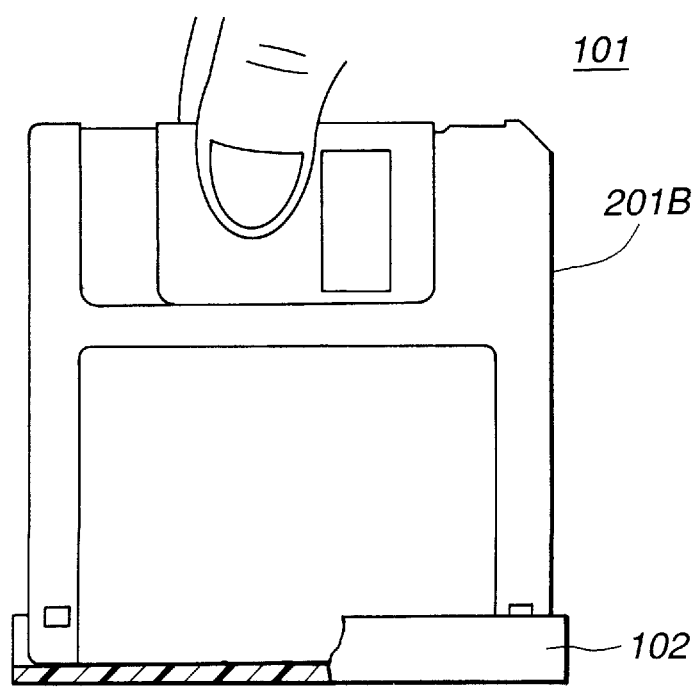
FIG. 57 is a view similar to FIG. 56, but depicting still another disadvantage possessed by the conventional cartridge holder.

When, as is seen from FIGS 44 and 48, the lid portions 6 and 7 are pivoted about the hinge portions 4 and 5 and put on each other to close the holder 1G, the edge like projections 42f of the lid portion 6 are brought into engagement with the aligned grooves 45a and 45b, and at the same time, the edge like projections 42g of the other lid portion 7 are brought into engagement with the aligned grooves 45c and 45b. As is seen from FIGS 46, 47, 50 and 51, due to the dove-tail structure possessed by the projections 42f and 42g and the grooves 45a, 45b and 45c, the engagement between the projections and the grooves is assuredly made. Thus, the undesired swell-out phenomenon of the back portions 3 is suppressed.

What is claimed is:

1. A cartridge holder comprising:
   a back portion provided at an inner surface thereof with a plurality of cartridge gripping parts;
   a pair of lid portions pivotally connected to opposed sides of said back portion through respective major hinge portions;
   lock means including a catching portion provided on a free end of one of said lid portions and a caught portion provided on a free end of the other of said lid portions, said catching and caught portions being brought into engagement with each other when said lid portions are pivoted about their respective major hinge portions in a direction to close the holder; and
   a plurality of extra hinge portions defined by said back portion, each extra hinge portion being provided between each adjacent two of said cartridge gripping parts and wherein the thickness of the extra hinge portions increases as the position where the extra hinge portion is located nears the center of said back portion and in which the thickness of the major hinge portions is the smallest.

2. A cartridge holder as claimed in claim 1, in which said back portion and said pair of lid portions are integrally constructed of a plastics and in which each of said major hinge portions is provided by reducing the thickness of a given part of said back portion.

3. A cartridge holder as claimed in claim 2, in which the thickness of the major hinge portions is smaller than that of the extra hinge portions.

4. A cartridge holder as claimed in claim 1, in which the thickness of one of said major hinge portions is greater than that of the other of said major hinge portions.

5. A cartridge holder comprising:
   a back portion provided at an inner surface thereof with a plurality of cartridge gripping parts, each cartridge gripping part being constructed to grip one side of a cartridge;
   a pair of lid portions pivotally connected to opposed sides of said back portion through respective major hinge portions;
   lock means including a catching portion provided on a free end of one of said lid portions and a caught portion provided on a free end of the other of said lid portions, said catching and caught portions being brought into engagement with each other when said lid portions are pivoted about the respective major hinge portions in a direction to close the holder; and
   cartridge retaining ribs formed on respective bottom walls of the pair of lid portions, each rib having a stopper edge for stopping displacement of the cartridge in a direction from the corresponding cartridge gripping part.

6. A cartridge holder as claimed in claim 5, in which each of said cartridge retaining ribs is so positioned that when the lid portions are about to assume their closed positions with the cartridge being improperly gripped by the corresponding cartridge gripping part in the holder, an upper end of the cartridge retaining rib abuts against a major surface of the cartridge.

7. A cartridge holder as claimed in claim 5, in which each of said cartridge retaining ribs has a seating rib which is so positioned that when the lid portions assume their closed positions with the cartridge properly installed therein, the seating rib puts thereon a major surface of said cartridge.

8. A cartridge holder as claimed in claim 7, in which the thickness of said seating rib is greater than the thickness of a card which is received on the bottom wall of the lid portion, and in which the thickness of said seating rib is so determined as to level the cartridge which has been gripped by the corresponding cartridge gripping part.

9. A cartridge holder as claimed in claim 8, in which the seating rib is integrally connected to a lower end of the cartridge retaining rib.

10. A cartridge holder as claimed in claim 7, in which one of said pair of lid portions is provided at its inner side with at least one stopper at a position near the corresponding major hinge portion for suppressing movement of the card toward said major hinge portion.

11. A cartridge holder as claimed in claim 5, in which said catching portion comprises a pawl member projected from the free end of one of the lid portions, and in which said caught portion comprises a recess formed in an inside surface of a projection projected from the free end of the other of the lid portions.

12. A cartridge holder comprising:
   a back portion provided at an inner surface thereof with a plurality of cartridge gripping parts, each cartridge gripping part being constructed to grip one side of a cartridge;
   a pair of lid portions pivotally connected to opposed sides of said back portion through respective major hinge portions;
   lock means including a catching portion provided on a free end of one of said lid portions and a caught portion provided on a free end of the other of said lid portions, said catching and caught portions being brought into engagement with each other when said lid portions are pivoted about the respective major hinge portions in a direction to close the holder;
   a plurality of extra hinge portions defined by said back portion, each extra hinge portion being provided between each adjacent two of said cartridge gripping parts; and
   a swell-out suppressing means for suppressing a swell-out movement of said back portion when said lid portions are pivoted about the respective major hinge portions in a direction to close the holder.

13. A cartridge holder as claimed in claim 12, in which said swell-out suppressing means comprises a clearance holding rib which is resiliently compressed between adjacent two of the cartridge gripping parts when the lid portions are pivoted in the closing direction.

14. A cartridge holder as claimed in claim 12, in which said swell-out suppressing means comprises:
   a projection formed on one of the lid portion and the cartridge gripping part; and
   a recess formed on the other of the lid portion and the cartridge gripping part,
   wherein when the lid portions are pivoted in the closing direction, said projection is brought into engagement with the recess to achieve a tight connection therebetween.

15. A cartridge holder as claimed in claim 14, in which said projection is formed on an inner surface of one side wall of the lid portion near the corresponding major hinge portion, and in which said recess is formed on a longitudinal end of the cartridge gripping part.

16. A cartridge holder as claimed in claim 14, in which said projection has a spherical head and is formed on an inner surface of one side wall of the lid portion near the corresponding major hinge portion, and in which said recess is a groove provided by a longitudinal end of the cartridge gripping part.

17. A cartridge holder as claimed in claim 16, in which the longitudinal end of said cartridge gripping part is formed above the groove with an inclined surface on which said projection slides, and in which said groove has an engaging surface with which said projection is engageable.

18. A cartridge holder as claimed in claim 15, in which the longitudinal end of said cartridge gripping part is formed above the recess with an inclined surface on which said projection slides.

19. A cartridge holder as claimed in claim 16, in which the longitudinal end of said cartridge gripping part is formed above the groove with an inclined surface on which said projection slides.

\* \* \* \* \*